United States Patent
Spaderna et al.

(12)

(10) Patent No.: US 6,331,977 B1
(45) Date of Patent: Dec. 18, 2001

(54) SYSTEM ON CHIP (SOC) FOUR-WAY SWITCH CROSSBAR SYSTEM AND METHOD

(75) Inventors: Dieter Spaderna, Portland, OR (US); Michael Roberts; Raed Sabha, both of Vancouver, WA (US)

(73) Assignees: Sharp Electronics Corporation, Mahwah, NJ (US); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/143,148

(22) Filed: Aug. 28, 1998

(51) Int. Cl.$^7$ .................................................... H04L 12/50
(52) U.S. Cl. ........................................... 370/360; 370/388
(58) Field of Search ..................................... 370/257, 357, 370/361, 386–388, 360, 392; 340/2.2, 2.21, 2.23, 2.24

(56) References Cited

U.S. PATENT DOCUMENTS

| | | | |
|---|---|---|---|
| 5,377,182 | 12/1994 | Monacos | 370/355 |
| 5,640,399 * | 6/1997 | Rostoker et al. | 370/392 |
| 5,668,809 * | 9/1997 | Rostoker et al. | 370/392 |
| 6,111,859 * | 8/2000 | Godfrey et al. | 370/257 |

* cited by examiner

Primary Examiner—Salvatore Cangialosi
(74) Attorney, Agent, or Firm—David C. Ripma; Matthew D. Rabdau; Scott C. Krieger

(57) ABSTRACT

A System On Chip (SOC) has been provided which includes a crossbar switch between 64 functional I/Os internal to the chip, and 40 external connection pins. The crossbar switch permits a signal at any of the 64 functional I/Os to appear at any of the connector pins. The cross bar switch, permitting signals at the 40 connector pins to appear at any of the 64 specified functional I/Os. Because the switching is done with 4-way switches, the total number of hierarchical switch layers is reduced to 3. A parallel, opposite oriented, network of switches permits input signals delivered to the physical I/Os to be switched to any of the 64 functional I/Os. The small number of switch layers permit connections to be made with a minimum of delay across the switch. A method corresponding to the above-described crossbar switch system is also provided.

21 Claims, 12 Drawing Sheets

Fig. 2 *(PRIOR ART)*
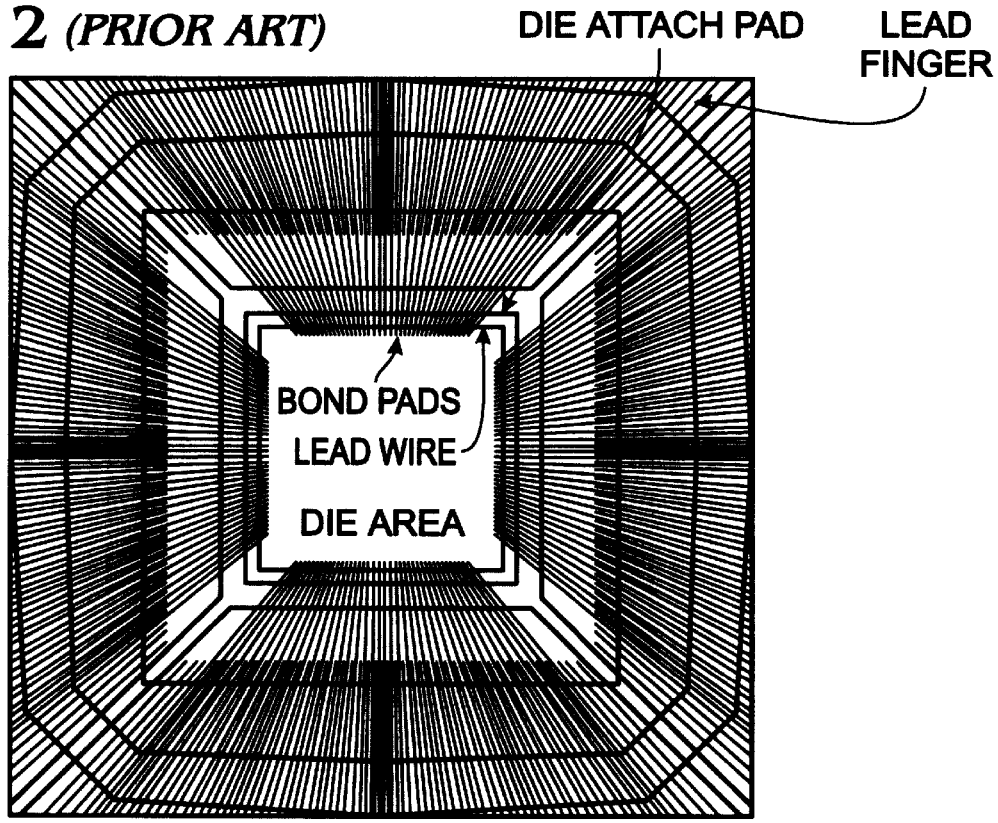
Fig. 3 *(PRIOR ART)*
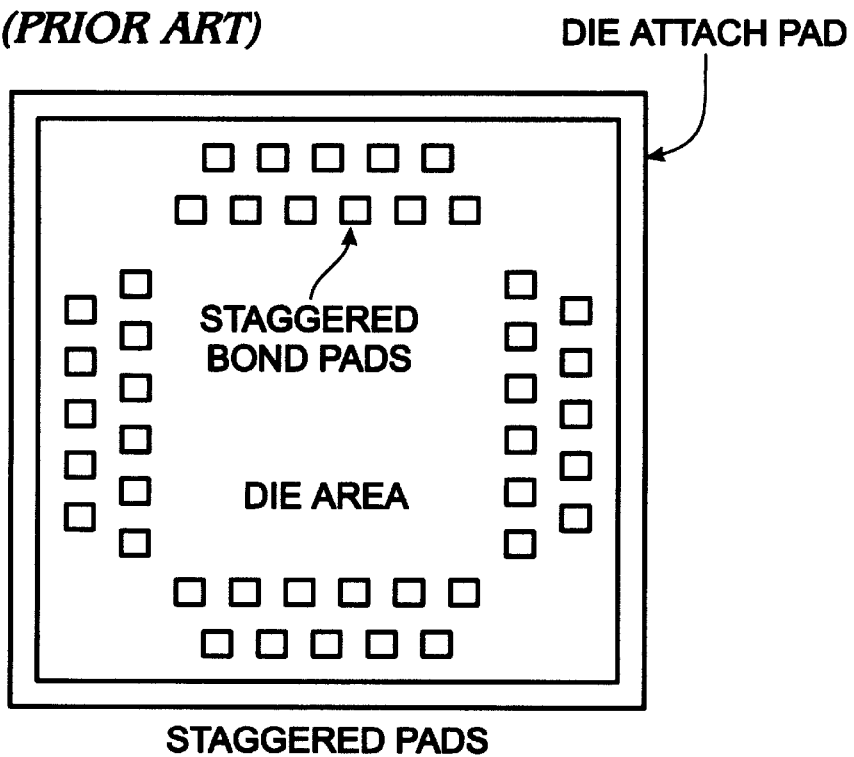
STAGGERED PADS

SYSTEM ON CHIP (SOC) FOUR-WAY SWITCH CROSSBAR SYSTEM AND METHOD

BACKGROUND AND SUMMARY OF THE INVENTION

This invention relates generally to an integrated circuit (IC) interface design and, more particularly, to a system and method of using a crossbar switching network to provide access to a plurality of selectable internal IC nodes from a smaller plurality of external interface pins.

Systems On Chip (SOC) design faces conflicting requirements. On the one hand, increasing the number of on-chip peripherals (SRAM, Cache, Serial & parallel I/O, DMA, etc) for maximum flexibility. On the other hand, reducing cost by limiting the number of external I/O and reducing package size. It is also desirable to provide visibility of some of the internal signals for silicon debugging.

The term SOC, as used herein refers to an IC which consists of a processor, embedded memory, various peripherals, and an external bus interface. FIG. 1 illustrates an example of a System On Chip from Sharp based on the ARM7 Thumb™ Core (prior art).

The processor in a SOC can be a CISC (Complex Instruction Set Computing) CPU such as x86 or 68k, or a RISC (Reduced Instruction Set Computing) CPU such as ARM™. The processor can also be a general purpose DSP (Digital Signal Processor) such as TI's DSP, a specialized DSP such as Sharp's Butterfly DSP™, or a combination of a CPU and a DSP.

Embedded memory can be either volatile (SRAM, DRAM) or non-volatile (ROM, Flash). Peripherals vary from the general purpose (Counter/Timers, UART, Parallel I/O, Interrupt controller, etc) to the specialized (LCD Controller, Graphics Controller, Network Controllers, etc). The external bus interface allows the SOC to interface with external memory devices and peripherals with little or no glue logic. The interface varies from a simple SRAM interface to a fully programmable universal interface.

In previous designs, an electronic system would be based on a board populated with a microprocessor or microcontroller, memory, discrete peripherals, and a bus controller. Today, such a system can fit on a single chip, hence the term System On Chip. Almost every semiconductor company that has a processor, or access to one, is developing System On Chip products. This advancement in technology allows system designers to reduce system testing and size, improve reliability, and shorten the time to market for their products.

Modern system design require fasts speeds and high integration at a low cost along with short time to market from SOC vendors. These requirements are contradictory in nature. A faster CPU requires a smaller process technology, ($0.35\mu$ or $0.25\mu$) which tends to cost more than an already established older process. Higher integration produces a larger die area, increases I/O pins, and requires a larger package size. This leads to higher die cost, higher pin test cost, and a more expensive package. The challenge is to achieve high integration yet lower the cost to be competitive in the market place.

System designers can reduce the cost of SOC in several ways such as using an older process, using less expensive packaging technology, reducing the number of I/O pins, or repositioning the I/O pads.

Using an older technology such as $0.65\,\mu$ to fabricate the SOC will reduce its cost. Older technologies are mature and their wafer cost is significantly lower than a newer technology such as $0.35\mu$. However, the older technology produces SOCs with large die size and low die count per wafer. In addition to that, the processor speed will be slow and, depending on the application, the SOC may not be competitive. The competition is always striving to use the latest in process technology.

Choosing a mature package technology such as TQFP (Thin Quad Flat Package) or QFP (Quad Flat Package) minimizes the cost of the package. More advanced packaging technologies, such as CSP (Chip Scale Packaging), tend to be higher in cost. However, CSP offers a smaller size, lighter weight, and faster speeds for those applications that demand such requirements. For example, handheld devices such as cell phones or PDAs (Personal Digital Assistant) which are area, and weight constrained, can benefit from such advanced packaging technologies.

Reducing the number of I/O pins on a SOC reduces package cost, and die size. Mature packages (e.g. QFP/TQFP) tend to have a $0.01–$0.015 cost associated with each I/O pin. Newer packages (e.g. CSP) tend to have a slightly higher cost associated with each I/O pin. As for the die size, each unique I/O pin requires a unique bond pad. FIG. 2 illustrates bond pads located along the sides of the die, forming a reduced die area (prior art). This minimum die area determines the minimum die cost. An IC is said to be "Pad Limited" when the actual die size is less than the minimum die area defined by the I/O pads. In this case, reducing the die size will not reduce its cost. However, reducing the number of I/O pins or staggering their pads will reduce the die area and thus die cost. As process technology gets more advanced ($0.35\mu \rightarrow 0.25\mu \rightarrow 0.18\,\mu$. . . ), SOC devices will be highly integrated and will tend to become "Pad Limited". This means that the number of I/O pins on a SOC will be a critical factor in determining the die size and SOC cost.

"Die Limited" IC is an IC with a die size that is greater than the minimum die area and the I/O pads have to be spread apart to make room for the die. In this case, reducing the die size will reduce its cost but will also sacrifice high integration.

Typically, bond pads are aligned along the sides of a package as shown in FIG. 2. FIG. 3 illustrates a staggered pad layout to reduce the die area (prior art). Staggering the pads results in reduced die area while maintaining all the I/O needed by the SOC. However, staggering pads introduce design and assembly challenges. On the design side, more I/Os will introduce noise that will require adding more power pins. Staggering pads significantly reduces the die area thus limiting the number of functions that can be integrated on the SOC. Staggered pads are generally used with very small die designs. On the assembly side, staggered pads can require special lead frame and fine pitch bonding machines, adding to assembly cost and time.

Reducing I/O pins on a SOC to reduce die size and cost requires multiplexing. For example, if a SOC requires 180 functional I/Os but the package offers only 140 physical I/Os (excluding power pins), the remaining 40 (180-140) functional I/Os have to be multiplexed. Assuming that out of the 140 available I/O, 120 are dedicated I/O and can't be multiplexed due to functionality or timing reasons (e.g. address bus, data bus . . . ), then 60 (180-120) functional I/Os and 20 (140-120) physical I/O remain. That is, each remaining physical I/O pin has three (60÷20) functional I/Os associated with it. Table 1 summarizes this example.

TABLE 1

I/O Multiplexing Example

| | |
|---|---|
| Function I/O Required | 180 |
| Physical I/O Available | 140 |
| Physical I/O Dedicated | 120 |
| Physical I/O Multiplexed | 20 |
| Functional I/Os per Multiplexed pin | 3 |

Traditionally, I/O multiplexing takes the form of assigning each physical pin a fixed number of functional I/Os. In the previous example, one of the non-dedicated I/O pins multiplexes three functional I/Os: F1, F2, and F3. The system designer is forced to select among functions F1, F2, and F3, unless these functions are also repeated on other non-dedicated I/O pins.

A more flexible solution is to allow each of the functional I/Os to map to every physical I/O pin. In the example provided, each of the 20 physical I/O pins will have all 60 functional pins mapped to it. This will give the system designer total flexibility to customize the systems' I/O according to the target application. It will also give the SOC designer the visibility of internal signals for debugging purposes. In the past, this flexibility has come with a price. The mapping logic is gate intensive, resulting in added delays and loading. The mapping logic also requires extra testing.

It would be advantageous if, in an SOC device, a physical I/O pin from an IC device could be assigned to a large number of functional I/Os. Further, it would be advantageous if many physical I/O pins, each had the capability of being assigned to the large number of functional I/Os.

It would be advantageous if a crossbar switch could be developed to interface between functional I/Os and physical I/Os in an IC with a minimum number of gates and stages of switching so that the time delay across the switch is minimized.

It would be advantageous if an IC crossbar switch could give a digital systems designer greater flexibility, with simplified design mapping, minimal the added delays and loading, and allow visibility of internal signals.

Accordingly, a System On Chip (SOC) crossbar switching network with a small time delay has been provided. The crossbar switching network comprises N input nodes, or functional I/Os, and N output nodes, or physical I/Os. In one aspect of the invention, N=64. (n) layers of N switches multiplex signals between the input and output nodes. In one aspect of the invention, n=3. Each switch has 2i signal inputs operatively connected to the input nodes. Each switch multiplexes the input signals to provide an output signal at a signal output. Further, each said switch has i control inputs to select which input signal is output by the switch. In one aspect of the invention, i=2. In the minimal stage concept of the present invention, $N=2^{(n+i+1)}$.

Switch networks can be added to permit bi-direction signal flow, from input nodes to output nodes, or from output nodes to input nodes. In this manner, signals at the output nodes are made operatively connectable to any input node.

In some aspects of the invention, there are only 40 physical I/O pins to interface to the 64 functional I/Os. Then, the switching is slightly simplified. Two layers of 64 switches, and 1 layer of 40 switches are needed to multiplex signals between the physical and functional I/Os.

A method for crossbar networking input signals from N input nodes to N output nodes in n stages of decision making, where $N=2^{(n+i+1)}$, is also provided. For example, when N=64, n=3, and i=2, the method comprising the steps of:

a) combining the 64 input signals into 16 vectors of 4 bits;

b) replicating the vectors of Step a) a total of 4 times, to generate a total of 64 vectors;

c) selecting one signal from each vector to provide an input signal to the next stage;

d) cycling through Steps a)-c) a total of 3 times, whereby each output node is selectively connectable to each of the 64 input nodes through 3 steps of decision making. At the end of the last cycle, each of the 64 vectors is programmable to provide any one of the 64 input signals.

The method allows input signals to be interfaced from the output connector pins to the internal functional I/O nodes. The method generally follows the steps described above. The method also provides for crossbar switching between N inputs and M output, where N>M. Further, the method provides for bi-direction switching between the N and M set of nodes.

BRIEF DESCRIPTION OF THE DRAWINGS

FIG. 2 illustrates bond pads located along the sides of the die, forming a reduced die area (prior art).

FIG. 3 illustrates a staggered pad layout to reduce the die area (prior art).

DETAILED DESCRIPTION OF THE PREFERRED EMBODIMENT

Figure 1:
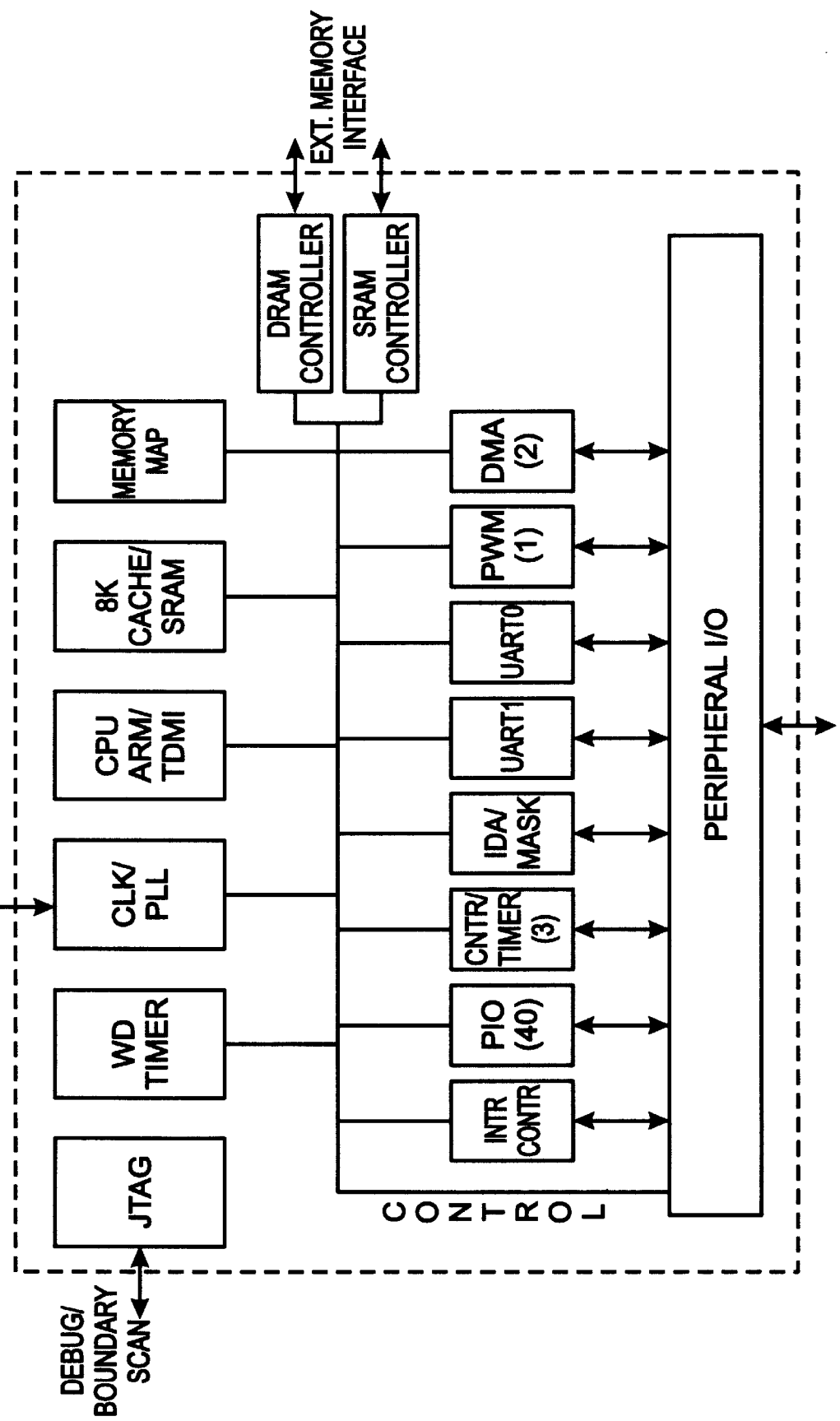
FIG. 1 illustrates an example of a System On Chip from Sharp based on the ARM7 Thumb™ Core (prior art).

Sharp Microelectronics Tech. has developed a crossbar switch for use in the LH79402 that has 40 uncommitted physical I/O pins but requires at least 64 pins to bring out all internal peripheral I/O signals (as in "Peripheral I/O" Block in FIG. 1). The design team realized that no system would require all these peripheral signals to be available simultaneously.

On the other hand, different systems would likely require different subsets of these signals in combinations that could not all be anticipated. The crossbar switch solves this problem by allowing each system designer to choose a pinout that best satisfies his or her needs. The function at each pin may also be changed dynamically, as system tasks change.

A brute force approach to this problem would provide for a gate connecting every potential input to every potential output. In this example, with 64 inputs and 40 outputs, the number of gates is 64×40=2560 for an unidirectional crossbar switch, or somewhat more than twice that for a more general bidirectional switch supporting both input and output signals. Moreover, the extensive interconnect required implies low gate area utilization for synthesized implementations.

Figure 4:
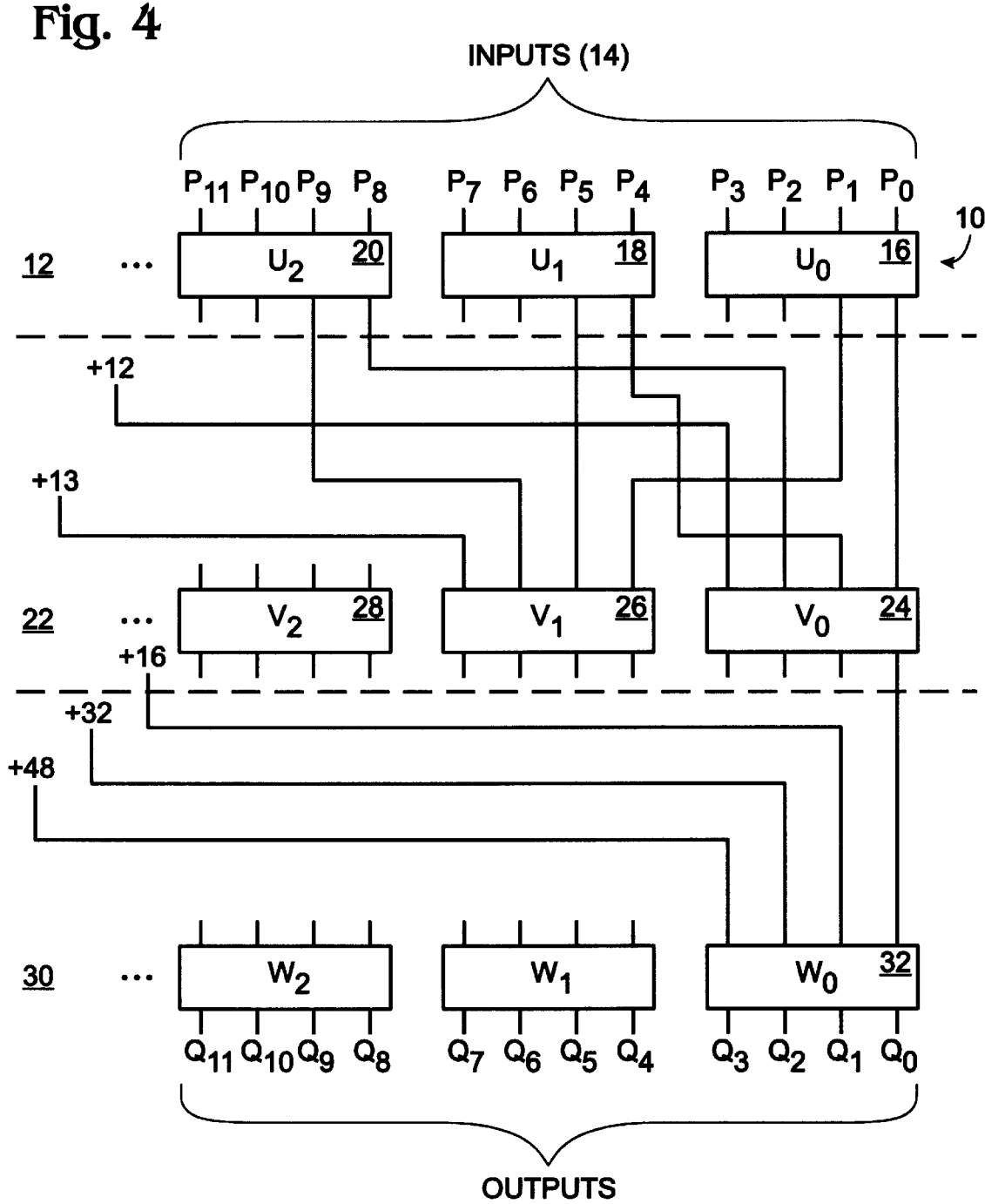
FIG. 4 illustrates the simplified hierarchical switching arrangement of the present invention.

FIG. 4 illustrates the simplified hierarchical switching arrangement of the present invention. The hierarchical approach switches with a tree structure of gates. In the Sharp design, a modular array 10 of 4-way switches is arranged in 3 hierarchical layers. A first layer 12 performs a reordering of the input pins 14 in groups of 4. Switch $U_0$ (16) is capable of arbitrarily reordering pins $P_3$–$P_0$. Switch $U_1$ (18) does the same for $P_7$–$P_4$, and so on for switch $U_2$ (20) and pins $P_{11}$–$P_8$.

A second layer 22 reorders the outputs of the U switches 16, 18, and 20 over a span of 4. Switch $V_0$ (24) reorders the first outputs of $U_0$, $U_1$, $U_2$ (16, 18, and 20), and $U_3$ (not shown). Switch $V_1$ (26) reorders the second outputs of $U_0$, $U_1$, $U_2$, (16, 18, and 20) and $U_3$. Switch $V_2$ (28) reorders the third outputs, and so on.

A third layer 30 reorders outputs of the V switches 24, 26, and 28 over a span of sixteen. Switch $W_0$ (32) reorders the first outputs of $V_0$, (24), $V_4$, $V_8$, and $V_{12}$ (not shown). Similarly, switch $W_1$ (34) reorders the second outputs of these same switches, continuing in this fashion until all outputs are reordered.

Each modular switch requires sixteen gates per switch layer, until the final layer where the single switch output only requires the use of ten gates. The total number of gates needed to implement the entire crossbar switch is only six hundred and seventy-two for the unidirectional version, or approximately twice that for the bidirectional version. This represents a significant gate count reduction over the conventional approach, and offers reduced gate loading and simpler wiring as well.

Figure 5:
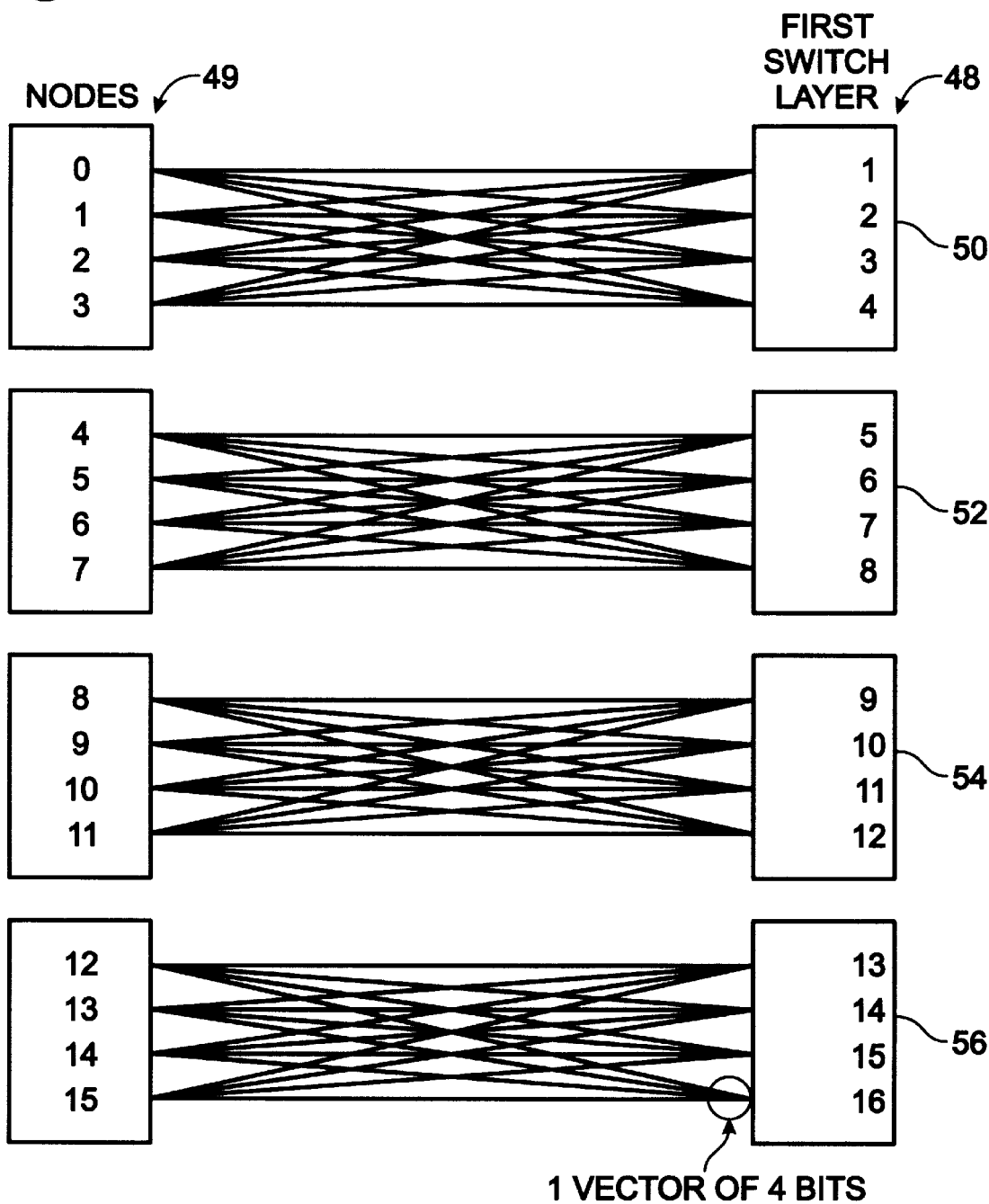
FIG. 5 represents the connection of 16 nodes to 16 switches in a first switch layer, in accordance with the present invention.

To clearly represent the crossbar system of the present invention some simplification has been performed in the representation of signal connections between nodes and switches in the crossbar network. FIG. 5 represents the connection of 16 nodes to 16 switches in a first switch layer 48, in accordance with the present invention. The switches 48 and nodes 49 are grouped in sections of 4, switch group 1 (50), switch group 2 (52), switch group 3 (54), and switch group 4 (56). As explained below, when i=2, for example, each node must be connected to 4 different switches. To simplify representation, the connections have been grouped into vectors.

Nodes 0–3 are connected to switch group 1 (50), which consists of switches 1–4. Switch 1 has 4 inputs to receive input signals from nodes 0–3. Likewise, switch 2, switch 3, and switch 4 all receive input signals from nodes 0–3. Each set of 4 signals from nodes 0–3 is defined as a vector. Because there are 4 signals in each vector it is a vector of 4 bits.

Figure 6:
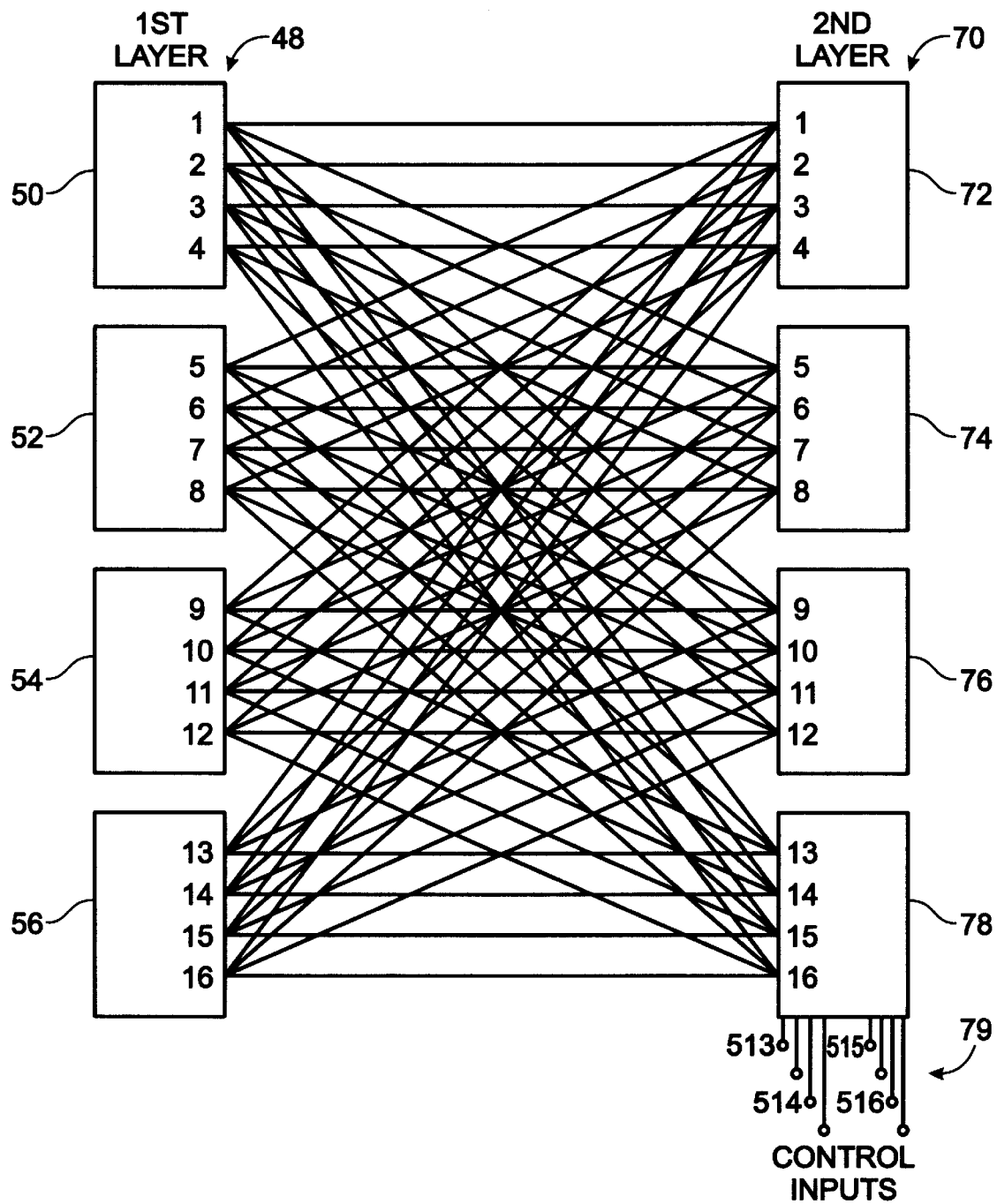
FIG. 6 illustrates the representation of connections made between a first and second layer of switches.

FIG. 6 illustrates the representation of connections made between a first 48 and second 70 layer of switches. Each of the 16 switch outputs of first layer 48 make 4 connections to switch inputs in second layer 70. Each switch group of 4 (2i) switches is controlled by 8 (4i) signals which direct one of the input signals to the output. For simplicity, control signals 79 are only shown connected to switch group 78.

Figure 7:
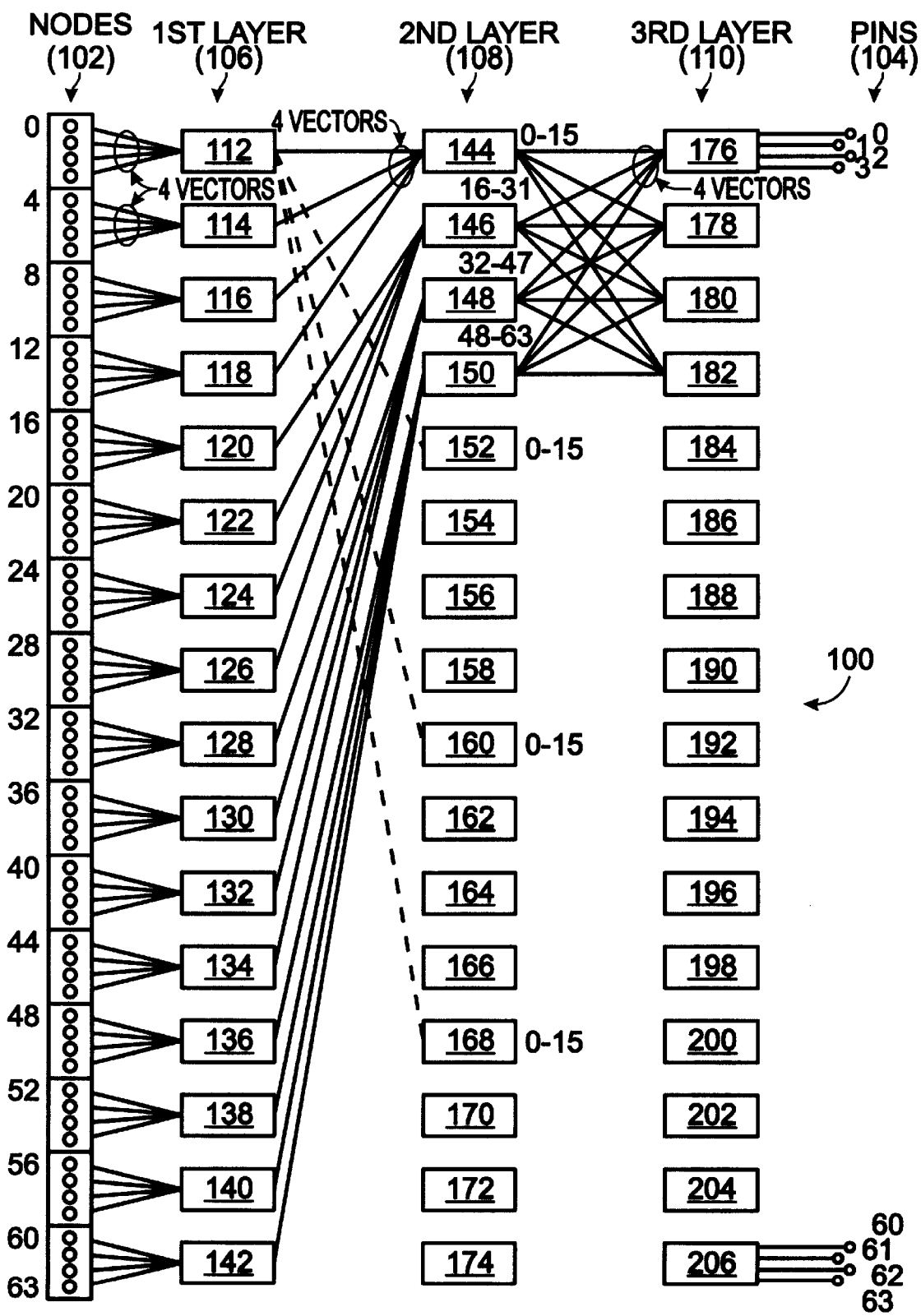
FIG. 7 illustrates a complete System of Chip (SOC) crossbar switching network with a small time delay.
Figure 10:
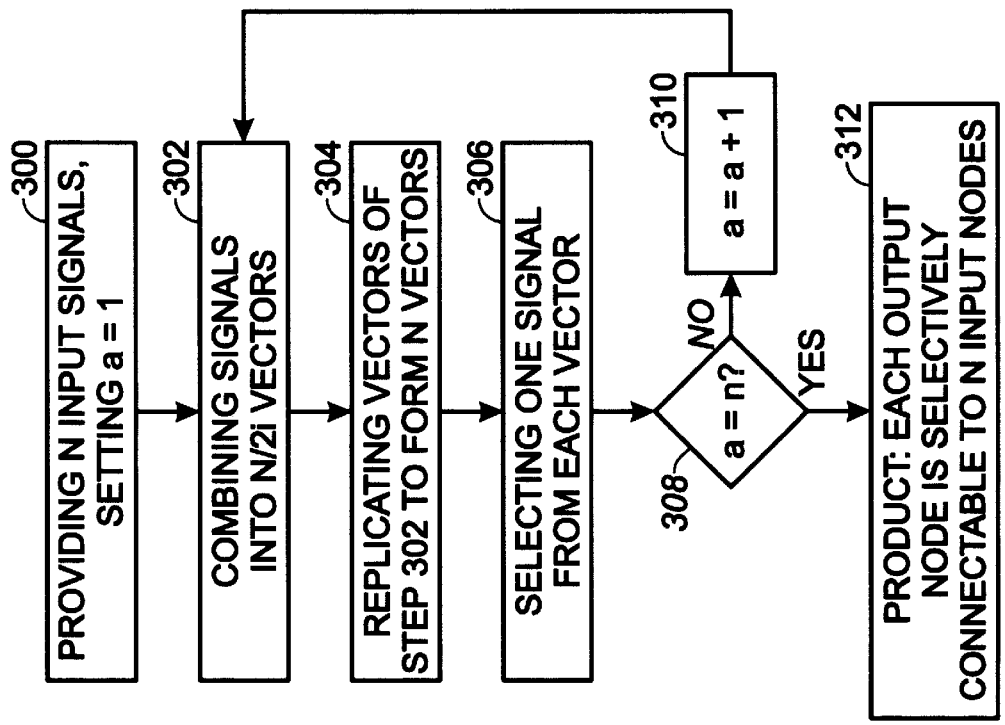
FIG. 10 is a flowchart illustrating a method, in an SOC, for crossbar networking input signals from N input nodes to N output nodes in n stages of decision making.

FIG. 7 illustrates a complete System On Chip (SOC) crossbar switching network 100 with a small time delay. Network 100 comprises N input nodes 102 and N output nodes, or pins 104. Although the principal of the present invention applies other values, a value of N=64 has been chosen to illustrate the invention in FIG. 10. (n) layers of N switches multiplex signals between input 102 and output 104 nodes. FIG. 10 illustrates a value of n=3, so that first 106, second 108, and third 110 switch layers are shown.

Each switch has 2i signal inputs operatively connected to input nodes 102. Each switch multiplexes the input signals to provide an output signal at a signal output. Each said switch has i control inputs (not shown, see FIG. 6) to select which input signal is output by the switch. In crossbar switch 100 of FIG. 10, i has been choose to equal 2, so that each switch has 4 input signals and each switch group 4 input vectors. A relationship exists between N, n, and i such that $N=2^{(n+i+1)}$, Crossbar switch 100 permits output node 104 to be connectable to any input node 102.

(N×2i) operative connections exist between each layer of switches. That is, between first layer 106 and second layer 108, and between second layer 108 and third layer 110. Also, (N×2i) operative connections exist between input nodes 102 and first layer of switches 106.

Figure 9:
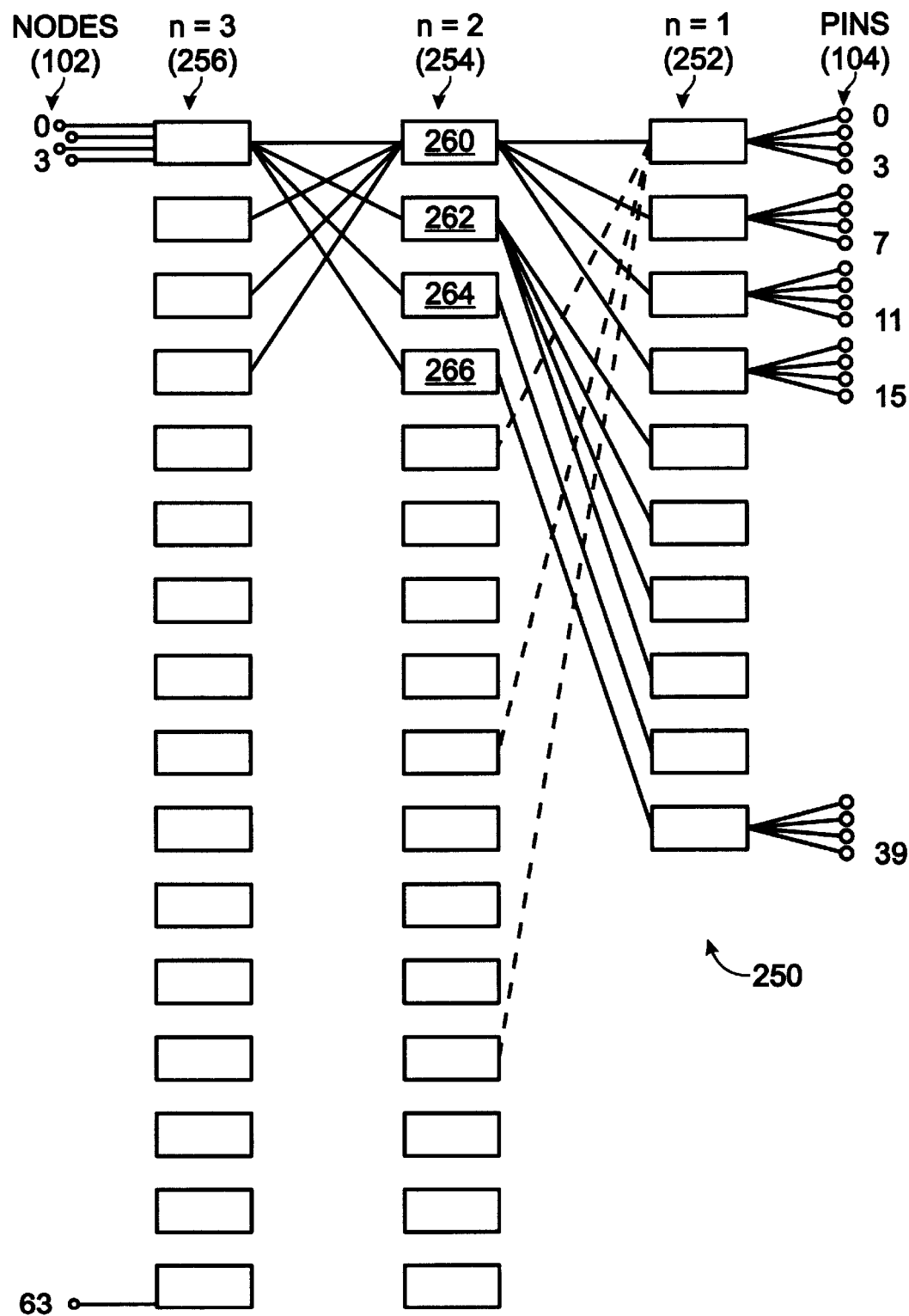
FIG. 9 illustrates the addition of a second, oppositely oriented switching network to the network of FIG. 8.

The switches of first switch layer 106 are organized into groups of 4. Each set of four switches is called a switch group, or modular switch, and is represented by a block, such as switch group 112. Input nodes 102 are organized into groups of 4 to provide a vector of 4 signals to a corresponding switch group as depicted in FIGS. 6, 7, and 9, and described above. Specifically, first layer switches 106 are operatively connected as described below.

Nodes 0–3 are operatively connected to the 4 inputs of the first switch group 112 to accept 4 input vectors, with each switch of first switch group 112 accepting one input vector, as shown in FIG. 5. First switch group 112 has four outputs, one output for each said switch to provide selectable signals from nodes 0–3. That is, using the control lines associated with each switch, the output of each switch is selected to provide one input signal from either node 0, node 1, node 2, or node 4. For simplicity, only one vector is shown connecting each node group of 4 to each switch group, even though a complete representation would show 4 vectors.

Nodes 4–7 are operatively connected to the 4 inputs of a second switch group 114 to accept 4 input vectors, with the 4 outputs of second switch group 114 providing selectable signals from nodes 4–7.

Nodes 8–11 are operatively connected to the 4 inputs of a third switch group 116 to accept 4 input vectors, with the 4 outputs of third switch group 116 providing selectable signals from nodes 8–11.

Nodes 12–15 are operatively connected to the 4 inputs of a fourth switch group 118 to accept 4 input vectors, with the 4 outputs of fourth switch group 118 providing selectable signals from nodes 12–15.

Note, the connection of input nodes and first layer switch groups is arbitrary. FIGS. 5 and 7 show all 4 vectors from nodes 0–3 going to first switch group 112. Alternately, the 4 vectors are directed to 4 different switch groups. However, it simplifies the drawing to connect the vectors as described above.

The outputs of first through fourth switch groups 112, 114, 116, and 118 are combined to form a second layer input vector. In this manner, selectable signals from nodes 0–15 are provided.

Nodes 16–63 are each operatively connected in groups of 4 to switch groups 5–16, as described above. Nodes 16–19 are operatively connected to a fifth switch group 120, nodes 20–23 are operatively connected to a sixth switch group 122, nodes 24–27 are operatively connected to a seventh switch group 124, with nodes 28–31 being operatively connected to a eighth switch group 126, with the outputs of said fifth through eighth switch groups combined to form a second layer input vector of selectable signals from nodes 16–31.

Nodes 32–35 are operatively connected to a ninth switch group 128, with nodes 36–39 being operatively connected to a tenth switch group 130, with nodes 40–43 being operatively connected to a eleventh switch group 132, with nodes 44–47 being operatively connected to a twelfth switch group 134, with the outputs of said ninth through twelfth switch groups combined to form a second layer input vector of selectable signals from nodes 32–47.

Nodes 48–51 are operatively connected to a thirteenth switch group 136, with nodes 52–55 being operatively connected to a fourteenth switch group 138, with nodes 56–59 being operatively connected to a fifteenth switch group 140, and with nodes 60–63 being operatively connected to a sixteenth switch group 142, with the outputs of said thirteenth through sixteenth switch groups combined to form a second layer input vector of selectable signals from nodes 48–63. First layer of switches 106 accepts 64 vectors of signals and outputs 64 vectors of multiplexed signals.

The organization of second layer of switches 108 proceeds along the same logic as the organization of first layer 106, the span of multiplexed output signals is increased by a factor of four. The combination of signals creating a vector and the switch order is arbitrary. As before, second layer of switches 108 is organized into groups of 4, with each switch having four inputs to accept a second layer input vector from first layer of switches 106. Each switch group having four outputs to provide a third layer input vector. Second layer switch groups 108 are operatively connected as described below.

A second layer first switch group 144 accepts 4 second layer input vectors from first layer first through fourth switch groups 112, 114, 116, and 118. Second layer first switch group 144 has four outputs, whereby each output signal includes selectable bits from nodes 0–15. For simplicity, FIG. 7 only shows the connection of 1 of these vectors. As in the connections between nodes 102 and first switch layer 106, there are actually 4 vectors to each second layer switch group. Again for simplicity, each of the sets of four vectors contains the same grouping of potential input nodes. That is, each of the four vectors input to switch group 144 contains of the signals from input nodes 0–15, although due to switching in first layer 106, the actual selected signal in each of these vectors is potentially different.

A second layer second switch group 146 accepts 4 second layer input vectors from first layer fifth through eighth switch groups 120, 122, 124, and 126, with second layer second switch group 146 having four outputs, whereby each output signal includes selectable bits from nodes 16–31. The switch order is arbitrary, the span of possible multiplexed signals in each vector need only expand by a factor of four after every switch layer. As mentioned above, the switches are organized in FIG. 7 so that the drawing of one vectors represents 4 actual vectors.

A second layer third switch group 148 accepts 4 second layer input vectors from first layer ninth through twelfth switch groups 128, 130, 132, and 134, with second layer third switch group 148 having four outputs, whereby each output signal includes selectable bits from nodes 32–47.

A second layer fourth switch group 150 accepts 4 second layer input vectors from first layer thirteenth through sixteenth switch groups 136, 138, 140, and 142, with second layer fourth switch group 150 having four outputs, whereby each output signal includes selectable bits from nodes 48–63.

One output signal from each of second layer first through fourth switch groups 144, 146, 148, and 150 are combined to form a third layer input vector, whereby selectable signals from nodes 0–63 are provided.

Second layer switch groups five through sixteen (152, 154, 156, 158, 160, 162, 164, 166, 168, 170, 172, and 174) are each operatively connected in groups of 4 to first layer switch groups one through sixteen (112–142) as described above. For the sake of clarity, most of the following described vectors are not shown in FIG. 10. Second layer fifth switch group 152 accepts 4 vectors from first layer first through fourth switch groups 112, 114, 116, and 118 (one element of a vector from switch group 112 is shown as dotted line) and provides four outputs, with second layer sixth switch group 154 accepting 4 vectors from first layer fifth through eighth switch groups 120, 122, 124, and 126 and providing 4 outputs. Second layer seventh switch group 156 accepts 4 vectors from first layer ninth through twelfth switch groups 128, 130, 132, and 134 and providing 4 outputs, with second layer eighth switch group 158 accepting 4 vectors from first layer thirteenth through sixteenth switch groups 136, 138, 140, and 142, and providing 4 outputs.

One output signal from each of second layer fifth through eighth switch groups 152, 154, 156, and 158 are combined to form third layer input vectors, whereby selectable signals from nodes 0–63 are provided.

Second layer ninth switch group 160 accepts 4 vectors from first layer first through fourth switch groups 112, 114, 116, and 118 (one element of a vector from switch group 112 is shown as a dotted line) and provides four outputs, with second layer tenth switch group 162 accepting 4 vectors from first layer fifth through eighth switch groups 120, 122, 124, and 126, and providing 4 outputs, with second layer eleventh switch group 164 accepting 4 vectors from first layer ninth through twelfth switch groups 128, 130, 132, and 134, and providing 4 outputs, with second layer twelfth switch group 166 accepting 4 vectors from first layer thirteenth through sixteenth switch groups 136, 138, 140, and 142, and providing 4 outputs.

One output signal from each of second layer ninth through twelfth switch groups 160, 162, 164, and 166 are combined to form third layer input vectors, whereby selectable signals from nodes 0–63 are provided.

Second layer thirteenth switch group 168 accepts 4 vectors from first layer first through fourth switch groups 112, 114, 116, and 118 (one element of a vector from switch group 112 is shown as a dotted line), and provides four outputs, with second layer fourteenth switch group 170 accepting 4 vectors from first layer fifth through eighth switch groups 120, 122, 124, and 126, and providing 4 outputs, with second layer fifteenth switch group 172 accepting 4 vectors from first layer ninth through twelfth switch groups 128, 130, 132, and 134, and providing 4 outputs, with second layer sixteenth switch group 174 accepting 4 vectors from first layer thirteenth through sixteenth switch groups 136, 138, 140, and 142, and providing 4 outputs.

One output signal from each of second layer thirteenth through sixteenth switch groups 168, 170, 172, and 174 are combined to form third layer input vectors, whereby selectable signals from nodes 0–63 are provided. Second layer of switches 108 accepts 64 vectors of signals and outputs 64 vectors of multiplexed signals.

Third layer of switches 110 is organized into groups of 4, with each said switch having four inputs to accept a third layer input vector from second layer of switches 108. Each switch group having four outputs to provide a output node vector. Third layer switch groups 110 are operatively connected as described below.

A third layer first switch group 176 accepts 4 third layer input vectors from second layer first through fourth switch groups 144, 146, 148, and 150. Third layer first switch group 176 has four outputs operatively connected to corresponding pins, or output nodes 0–3 (104) to provide output node vectors, whereby each output node vector includes selectable bits from nodes 0–63. As mentioned earlier, the combination of vectors (or ordering of switches) is arbitrary. Vectors are not connected to third switch layer 110 exactly as described herein if switch layers one (106) and two (108) are connected differently. The vectors need only be connected to increase the span of the multiplexed possibility of signals by a factor or four. Likewise, the outputs of switch layer three (110) and connectable to any node (104).

A third layer second switch group 178 accepts 4 third layer input vectors from second layer first through fourth switch groups 144, 146, 148, and 150, with third layer second switch group 178 having four outputs operatively connected to corresponding output nodes 4–7 to provide output node vectors, whereby each output node vector includes selectable bits from nodes 0–63.

For simplicity, FIG. 7 shows 1 vector connected to the input of switch group 176. This vector is composed of the outputs of four switches. For example, the output of the first (top) switch of 4 successive switch groups, as shown in FIG. 6. Since the vectors are the "same", they are represented as 4 vectors combined. As mentioned above, the 4 vectors are not literally identical, they are potentially identical, since they each contain the potential input signals from node 102. Different switches are typically thrown in switch layers 106 and 108 to make the contents of the 4 vectors literally different.

A third layer third switch group 180 accepts 4 third layer input vectors from second layer first through fourth switch groups 144, 146, 148, and 150, with third layer third switch group 180 having four outputs operatively connected to corresponding output nodes 8–11 to provide output node vectors, whereby each output node vector includes selectable bits from nodes 0–63.

A third layer fourth switch group 182 accepts 4 third layer input vectors from second layer first through fourth switch groups 144, 146, 148, and 150, with third layer fourth switch group 182 having four outputs operatively connected to corresponding output nodes 12–15 to provide output node vectors, whereby each output node vector includes selectable bits from nodes 0–63.

A third layer fifth switch group 184 accepts 4 third layer input vectors from second layer fifth through eighth switch groups 152, 154, 156, and 158, with third layer fifth switch group 184 having four outputs operatively connected to corresponding output nodes 16–19 to provide output node vectors, whereby each output node vector includes selectable bits from nodes 0–63.

A third layer sixth switch group 186 accepts 4 third layer input vectors from second layer fifth through eighth switch groups 152, 154, 156, and 158, with third layer sixth switch group 186 having four outputs operatively connected to corresponding output nodes 20–23 to provide output node vectors, whereby each output node vector includes selectable bits from nodes 0–63.

A third layer seventh switch group 188 accepts 4 third layer input vectors from second layer fifth through eighth switch groups 152, 154, 156, and 158, with third layer seventh switch group 188 having four outputs operatively connected to corresponding output nodes 24–27 to provide output node vectors, whereby each output node vector includes selectable bits from nodes 0–63.

A third layer eighth switch group 190 accepts 4 third layer input vectors from second layer fifth through eighth switch groups 152, 154, 156, and 158, with third layer eighth switch group 190 having four outputs operatively connected to corresponding output nodes 28–31 to provide output node vectors, whereby each output node vector includes selectable bits from nodes 0–63.

A third layer ninth switch group 192 accepts 4 third layer input vectors from second layer ninth through twelfth switch groups 160, 162, 164, and 166, with third layer ninth switch group 192 having four outputs operatively connected to corresponding output nodes 32–35 to provide output node vectors, whereby each output node vector includes selectable bits from nodes 0–63.

A third layer tenth switch group 194 accepts 4 third layer input vectors from second layer ninth through twelfth switch groups 160, 162, 164, and 166, with third layer tenth switch group 194 having four outputs operatively connected to corresponding output nodes 36–39 to provide output node vectors, whereby each output node vector includes selectable bits from nodes 0–63.

A third layer eleventh switch group 196 accepts 4 third layer input vectors from second layer ninth through twelfth switch groups 160, 162, 164, and 166, with third layer eleventh switch group 196 having four outputs operatively connected to corresponding output nodes 40–43 to provide output node vectors, whereby each output node vector includes selectable bits from nodes 0–63.

A third layer twelfth switch group 198 accepts 4 third layer input vectors from second layer ninth through twelfth switch groups 160, 162, 164, and 166, with third layer twelfth switch group 198 having four outputs operatively connected to corresponding output nodes 44–47 to provide output node vectors, whereby each output node vector includes selectable bits from nodes 0–63.

A third layer thirteenth switch group 200 accepts 4 third layer input vectors from second layer thirteenth through sixteenth switch groups 168, 170, 172, and 174, with third layer thirteenth switch group 200 having four outputs operatively connected to corresponding output nodes 48–51 to provide output node vectors, whereby each output node vector includes selectable bits from nodes 0–63.

A third layer fourteenth switch group 202 accepts 4 third layer input vectors from second layer thirteenth through sixteenth switch groups 168, 170, 172, and 174, with third layer fourteenth switch group 202 having four outputs operatively connected to corresponding output nodes 52–55 to provide output node vectors, whereby each output node vector includes selectable bits from nodes 0–63.

A third layer fifteenth switch group 204 accepts 4 third layer input vectors from second layer thirteenth through sixteenth switch groups 168, 170, 172, and 174, with third layer fifteenth switch group 204 having four outputs operatively connected to corresponding output nodes 56–59 to provide output node vectors, whereby each output node vector includes selectable bits from nodes 0–63.

A third layer sixteenth switch group 206 accepts 4 third layer input vectors from second layer thirteenth through sixteenth switch groups 168, 170, 172, and 174, with third layer sixteenth switch group 206 having four outputs operatively connected to corresponding output nodes 60–63 to provide output node vectors, whereby each output node vector includes selectable bits from nodes 0–63.

Typically, crossbar switch 100 is including as part of an integrated circuit (IC) having at least N externally accessible input/output (I/O) pins and N functional I/O nodes internal to the IC (not shown). Crossbar switch internal nodes are operatively connected with functional I/O nodes to provide said N I/O pins with a plurality of possible signals.

Additional switching networks added to the SOC permit bi-direction signal flow, from input nodes 102 to output nodes 104, and from output nodes 104 to input nodes 102, whereby the signal at every output node 104 is operatively connectable to any input node 102. That is, a crossbar switch (not shown) identical to crossbar switch 100, but in the reverse direction, is arranged between output nodes 104 and input nodes 102 to direct input signals at output nodes 104 to functional I/Os 102 in the IC. Alternately said, the second crossbar switch bringing input signals from physical I/Os 104 to functional I/Os 102 is representing by simply substituting physical I/Os for the functional I/Os at the left side of FIG. 7. Likewise, the functional I/Os are substituted for the physical I/Os on the right side of FIG. 7. The two crossbar switches exist in parallel to direct signals from in the IC to the outside and from outside to inside the IC. The elements of the second crossbar switch are clearly described in the explanation of network 100, above. FIG. 9, described below, represents such a network where there are only 40 physical pins (104) interfacing with 64 internal nodes (102)

An alternate switch configuration exists which, in different aspects of the invention, connects functional I/Os to physical I/Os and physical I/Os to functional I/Os. The use of a high impedance switch, as is well known in the art permits the function and signal flow of the above-described switches to be reversed. That is, a switch is alternately representing as having a signal input which enters the switch, and four possible outputs exiting the switch. The switch operates by selecting only one of the four outputs to receive the input signal.

In FIG. 7, crossbar switch 100 is represented by the above-described alternate switch operation by merely swapping the labels of nodes 102 and 104, and switch layers 106 and 110. That is, nodes 104 are the input, nodes 102 are the output, 110 is the first layer of switches and 106 is the third layer of switches. Each first layer 110 switch has one signal input operatively connected to one corresponding input node 104. Each switch having 2i signal outputs, with each switch selectively providing the input signal at one the outputs. Each said switch has control inputs to select which output is selected (not shown in FIG. 7, see FIG. 6).

Figure 8:
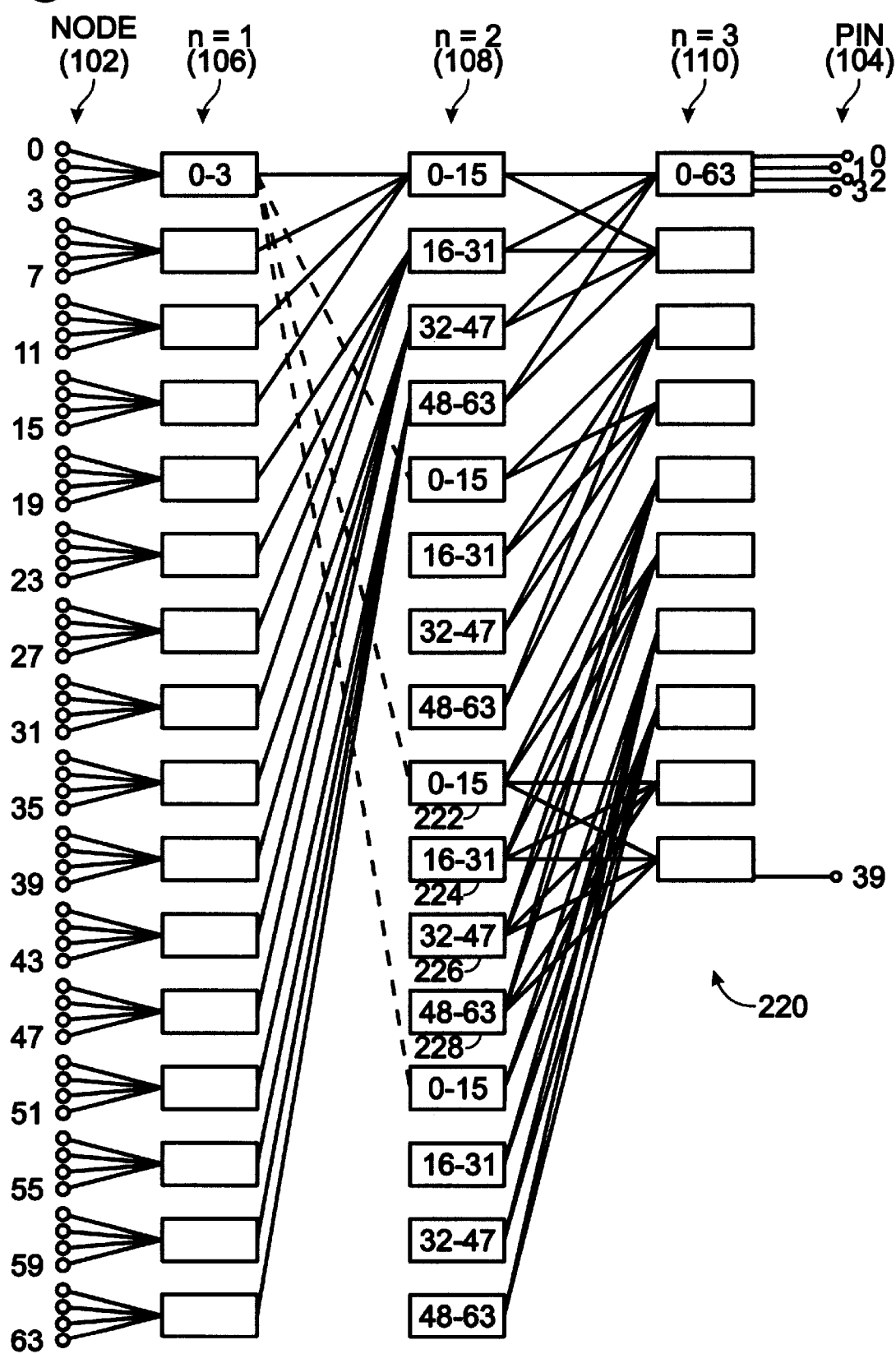
FIG. 8 illustrates a specific application of the invention, an SOC with a crossbar connection network connecting N functional I/Os to M physical I/Os, where M<N.
Figure 11:
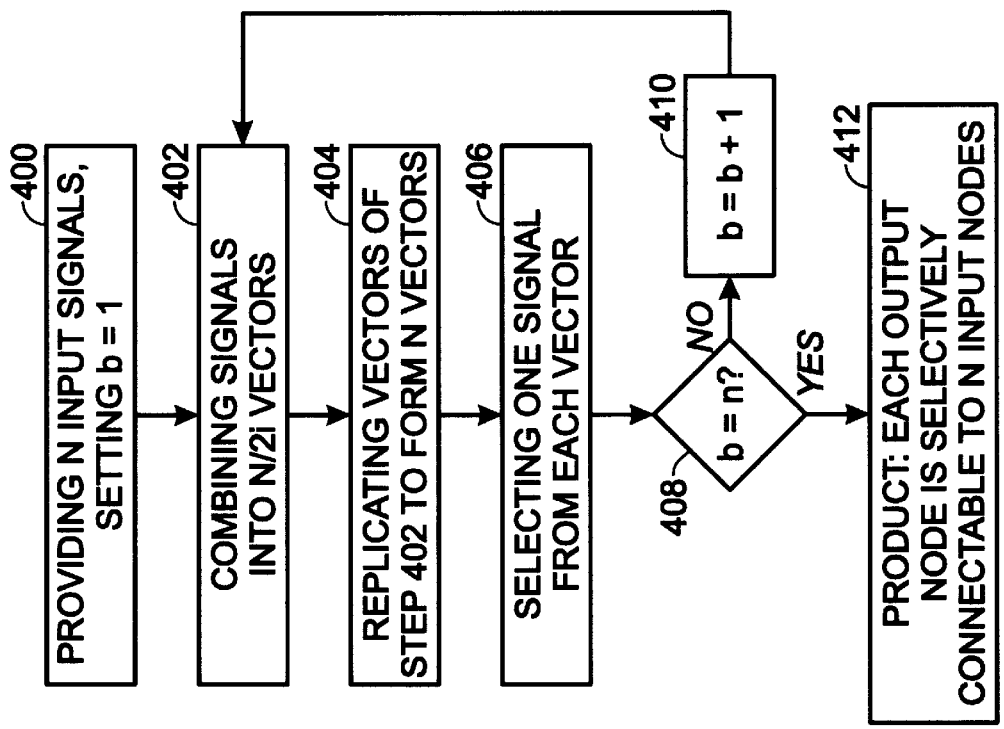
FIG. 11 is a flowchart illustrating a method in an SOC where signals at the output nodes are provided to the input nodes.

FIG. 8 illustrates a specific application of the invention, an SOC with a crossbar connection network connecting N functional I/Os to M physical I/Os, where M<N. As above, $N=2^{(n+i+1)}$. Specifically, an example is shown where N=64, M=40, n=3, and i=2. Switch 220 functions almost exactly as crossbar switch 100 of FIG. 10, so an explanation of switch 220 will not be repeated. The difference between switch 100 and 220 is that switch 220 has fewer I/O pins than functional I/Os. There are 64 functional input/output (I/O) nodes internal to the IC, and 40 I/O pins to physically access the IC. Then, there are two [or (n−1)] layers of sixty-four (N) switches to multiplex signals from input nodes (102) to (n−1) switch layers 106 and 108, and one final layer (110) of forty (M) switches to multiplex signals between the final switch group 110 and physical I/Os 104. Four vectors need not be supplied by every second [or (n−1)th] switch layer switch group. FIG. 11 shows only switch groups 202, 204, 206, and 208 supplying four vectors to the inputs of the third switch group. Alternately, other second level switch groups supply four vectors. In another alternative, eight switch groups each provide three vectors and eight switch groups each supply two vectors. Several arrangements creating a total of 40 vectors are possible.

As before, each switch has 4 signal inputs operatively connected to the input nodes. Each switch multiplexes the input signals to provide an output signal at a signal output. Each switch has 2 control inputs to select which input signal is output by the switch, whereby each said output node is connectable to any input node.

As in FIG. 7, there are 256 (N×2i) operative connections, with the operative connections grouped in sets of 4 (2i) to form 64 (N) vectors, between first 106 and second 108 layers of switches and between functional I/Os 102 and first layer of switches 106.

FIG. 9 illustrates the addition of a second, oppositely oriented switching network 250 to network 220 of FIG. 8. In some aspects of the invention, second network 250 permits bi-direction signal flow from physical pins 104 to functional I/Os 102, whereby the signal at each pin 104 is operatively connectable to any functional I/O 102. In FIG. 9, N=64, M=40, n=3, and i=2. Pins 104 are connected to one switch layer (first switch group 252) of M switches to multiplex signals from M physical pins 104 to (n−1) switch layers 254 and 256. That is switch layer where n=2 and n=3. The connections between first layer 252 and second layer 254 are somewhat arbitrary. Not all switch groups of second layer 254 need receive 4 vectors. In FIG. 9, second layer switch groups 260 and 262 receive 4 vectors output from first layer 252. Second layer switch groups 264 and 266 receive only one vector each. A total of 10 vectors are received by four switch groups, in groups of 4, 4, 1, and 1. Alternately, the vector assignments are 3, 3, 3, and 1, or in other combinations totaling 10.

The other (n−1) layers of N switches, in this example switch layer 254 and 256, multiplex signals between switch layers 252, 254, and 256, and input nodes 102. As before, $N=2^{(n+i+1)}$. The operation of the switch groups and vector organization is identical to that of FIG. 7, described above, and is not repeated here.

FIG. 10 is a flowchart illustrating a method, in an SOC, for crossbar networking from N input nodes to N output nodes in n stages of decision making. Step 300 provides N input signals at the input nodes and provides that $N=2^{(n+i+1)}$. Further, counter a is set to 1. Step 302 combines the N input signals into vectors of 2i bits to form N/2i vectors. That is, the vectors are made up of signals from 4 different inputs. Step 304 processes, or replicates each vector of Step 302 a total of 2i times to form a total of N vectors. Step 306 selects one signal from each vector to provide an input signal to the next stage. Step 308 is a decision block that allows the method to cycle through Steps 302 to 306 a total of n times. If counter a is not equal to n, 1 is added to the counter in Step 310 and the method proceeds to Step 302. If counter a is equal to n, then the method proceeds to Step 312, a product whereby each output node is selectively connectable to each of the N input nodes through n steps of decision making. As shown in FIG. 7 and described above, in some aspects of the invention, N=64, i=2, and n=3.

The method depicted in FIG. 10 operates as a switch. Signals are input to a switch from four input (2i) nodes, with each node being connected to four (2i) different switches. Each switch selects on of the four inputs as an output. Therefore, each switch functions as a factor-of-four multiplexer. After three layers of switches, 64 (N) multiplexed output signals exist which are programmable to provide one of the signals from input nodes 0–63 (see FIG. 7).

FIG. 11 is a flowchart illustrating a method in an SOC where signals at the output nodes are provided to the input nodes. Step 400 provides input signals at the output nodes and sets a counter b=1. Step 402 combines the N input signals into vectors of 2i bits to form N/2i vectors. Step 404 replicates the N input signals by a factor of 2i to form N vectors. Step 406 selects one signal from each vector to provide an input signal to the next stage. Step 408 is a decision block that allows the method to cycle through Steps 402 to 406 a total of n times. If counter b is not equal to n, 1 is added to the counter in Step 410 and the method proceeds to Step 402. If counter b is equal to n, then the method proceeds to Step 412, a product where each of the N output nodes is selectively connectable to each of the N input nodes through n steps of decision making.

In some aspects of the invention, Steps 302–310 occur simultaneously with Steps 402–410, whereby the method permits bi-direction signal flow, from the input nodes to the output nodes, and from the output nodes to the input nodes.

Figure 12:
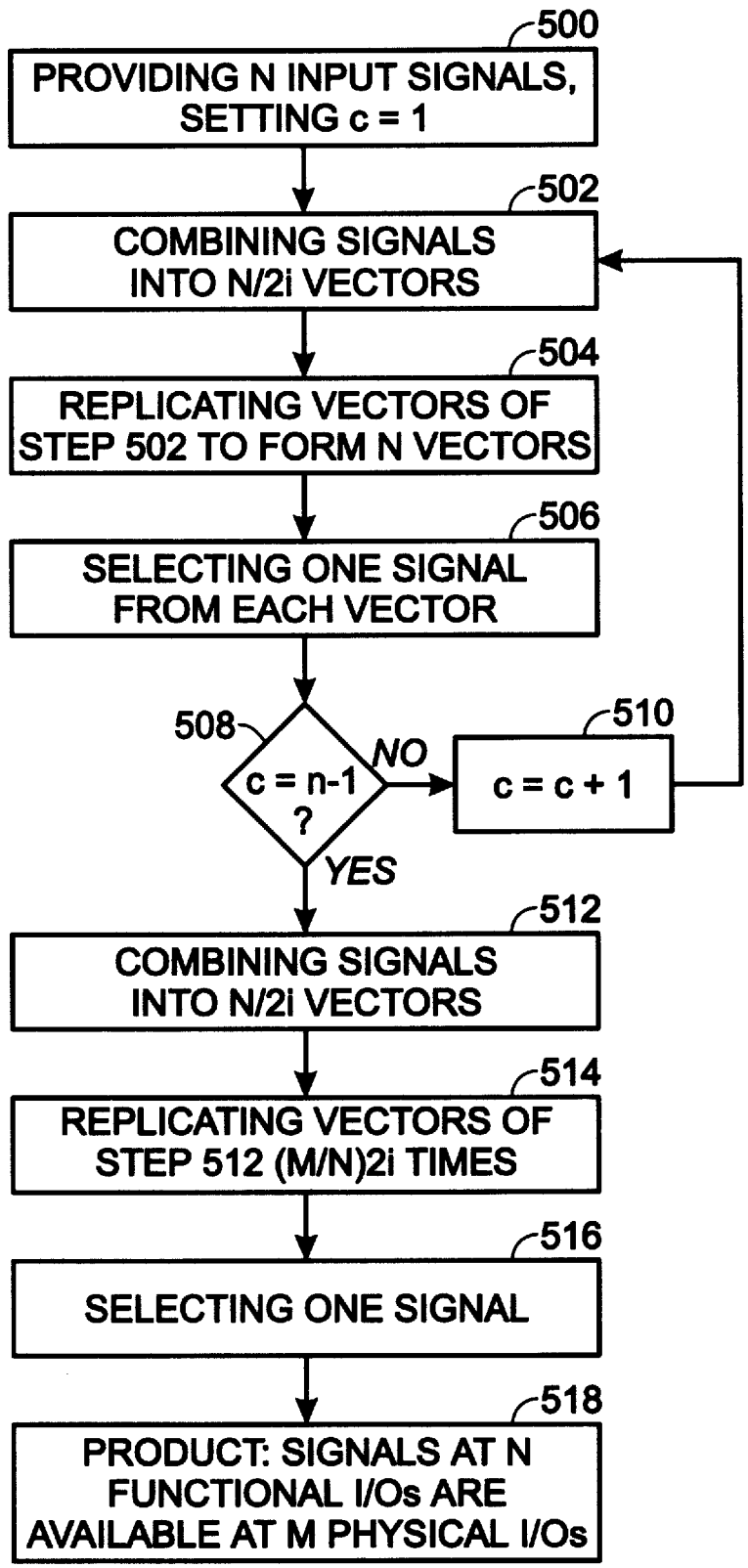
FIG. 12 is a flowchart illustrating a method, in an SOC, for crossbar networking from N functional I/Os in an IC to M external connector pins in n stages of decision making.

FIG. 12 is a flowchart illustrating a method, in an SOC, for crossbar networking from N functional I/Os in an IC to M external connector pins in n stages of decision making. Step 500 provides N input signals at the functional I/Os and sets counter c=1, and provides that $N=2^{(n+i+1)}$. In one aspect of the invention, N=64, M=40, n=3, and i=2. Step 502 combines the N input signals into vectors of 2i bits to form N/2i vectors. Step 504 processing, or replicates each vector of Step 502 a total of 2i times to form a total of N vectors. Step 506 selects one signal from each vector to provide an input signal to the next stage. Step 508 is a decision block which permits the method to cycle through Steps 502 to 506 a total of (n−1) times. If c is not equal to (n−1), the method proceeds to Step 510 where counter c is incremented by 1, and the method proceeds to Step 502. If c=(n−1), then the method proceeds to Step 512.

Step 512 combines the N input signals into vectors of 2i bits to form N/2i vectors. Step 514 processes, or replicates each vector of Step 512 at least (M/N)2i times to form a total of M vectors. As shown in FIG. 8, every switch group of the second layer of switches need not output 4 vectors. When N=64 and M=40, half the switch groups can output 3 vectors and the other half of the switch groups can output 2 vectors, so that the average vector output is 2.5. Step 516 selects one signal from each vector to provide an input signal to each of the M connector pins. Step 518 is a product, whereby signals at the N functional I/Os are made available at the M connector pins. In an alternative aspect of the invention, only 12 switch groups are needed in the second [or (n−1)th] layer of switch to provide 40 vectors to the third switch group. That is, eight switch groups provide 32 of the vectors to the third layer, and 4 switch groups provide 8 of the vectors.

Figure 13:
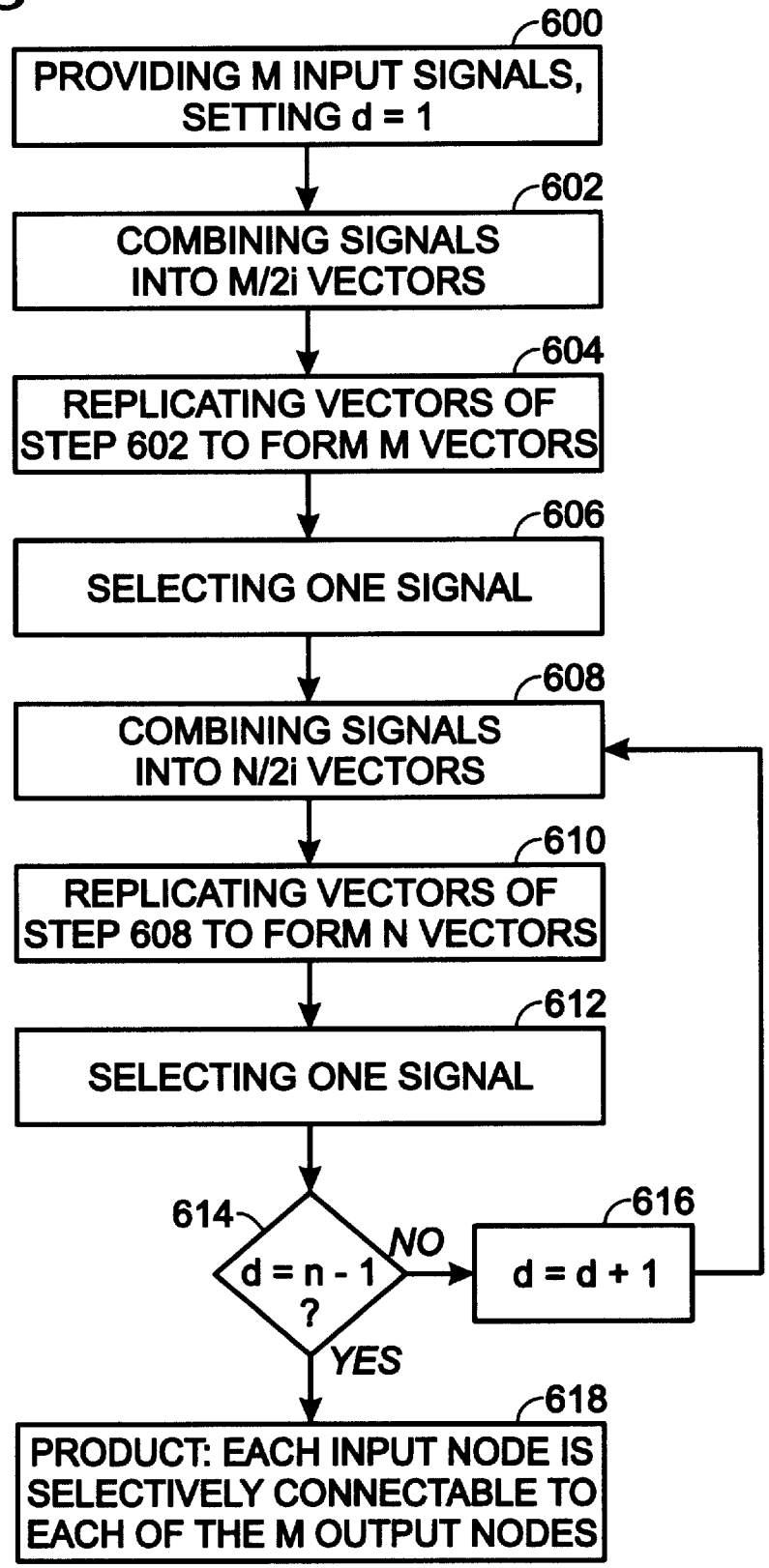
FIG. 13 is a flowchart illustrating a method, in an SOC, of providing signals from the M connector pins to the N functional I/Os.

FIG. 13 is a flowchart illustrating a method, in an SOC, of networking signals from the M connector pins to the N functional I/Os. Step 600 provides input signals to the M connector pins and sets a counter d=1. Step 602 combines the M input signals into vectors of 2i bits each to form M/2i vectors. Step 604 replicates each vector formed in Step 602 a total of 2i times to form a total of M/2i vectors. Step 606 selects one signal from each vector to provide an input signal to the next stage. Step 608 combines the M input signals into vectors of from 1 to 2i bits, to form a total of N/2i vectors. Step 610 replicates each vector of in Step 608 a total of 2i times to form N vectors. Step 612 selects one signal from each vector to provide an input signal to the next stage.

Step 614 is a decision block which permits the method to cycle through Steps 608 to 612 a total of (n−1) times. If the counter d is not equal to (n−1) then the method proceeds to Step 616 where counter d is increment by 1, and the method proceeds to Step 608. If counter d=(n−1) the method proceeds to Step 618, a product where each input node is selectively connectable to each of the M output nodes through n steps of decision making.

In some aspects of the invention, Steps 500–518 occur simultaneously with Steps 600–618, whereby the method permits bi-direction signal flow, from the functional I/Os to the connector pins, and from the connector pins to the functional I/Os. In some aspects of the invention, N=64, M=40, n=3, and i=2.

Figure 14:
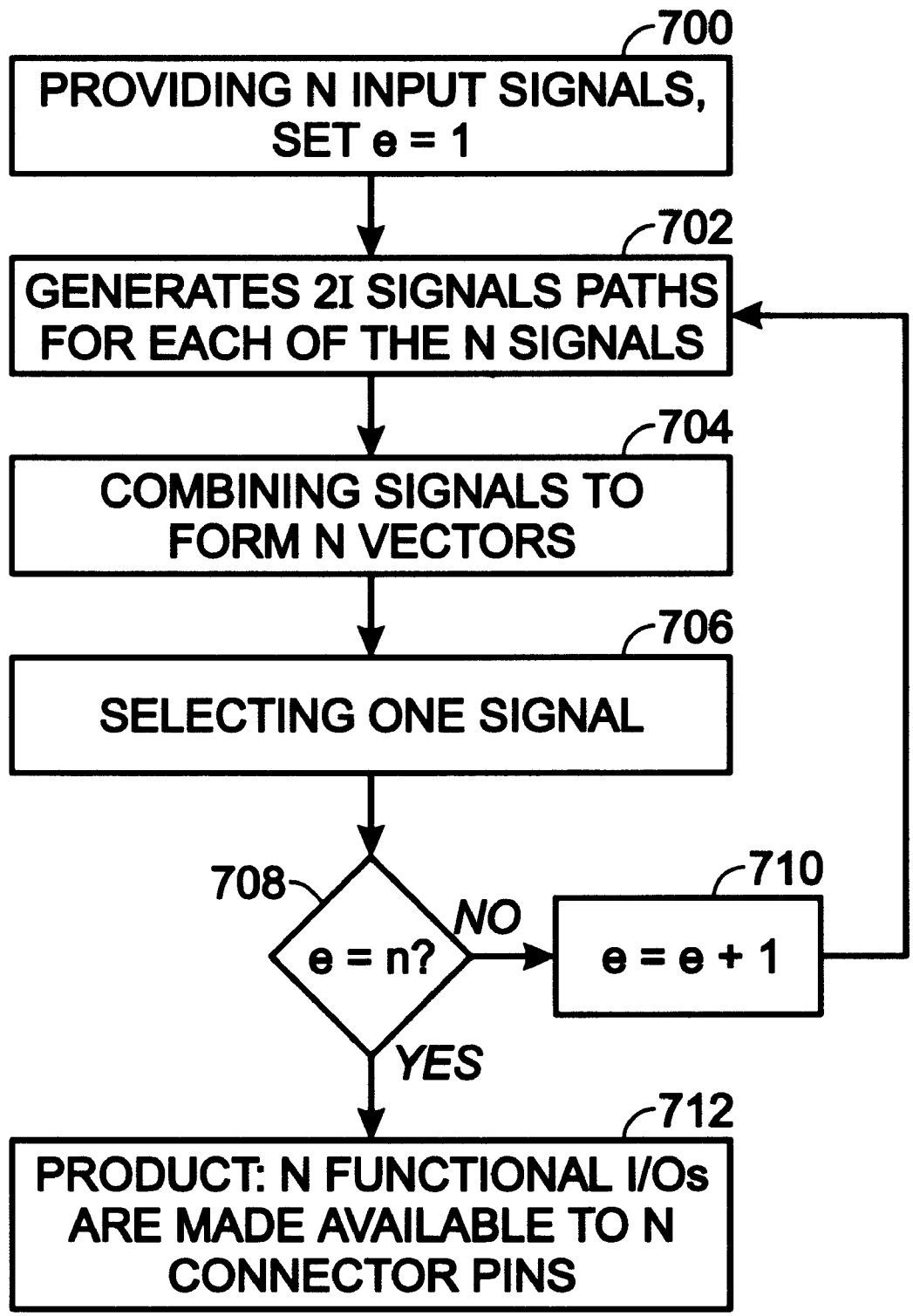
FIG. 14 illustrates an alternate embodiment of a method for crossbar networking input signals from N functional I/Os in an SOC, to N external connector pins in n stages of decision making using high impedance switches.

FIG. 14 illustrates an alternate embodiment of a method for crossbar networking input signals from N functional I/Os in a System On Chip (SOC), to N external connector pins in n stages of decision making using high impedance switches. Step 700 provides input signals at the functional I/Os and sets counter e=1, and provides that $N=2^{(n+i+1)}$. Step 702 generates 2i signal paths for each of the N input signals. Step 704 combines the (2i)N input signals into vectors of 2i bits to form N vectors. Step 706 selects one signal from each vector to provide an input signal to the next stage. Step 708 is a decision block which permits the method to cycle through Steps 702 to 706 a total of n times. If e is not equal to n, the method proceeds to Step 710 where counter e is incremented by 1, and the method proceeds to Step 702. If e=n, then the method proceeds to Step 712. Step 712 is a product, whereby signals at the N functional I/Os are made available at the N connector pins.

The same concept defined in the above paragraph applies to bi-directional switch methods and networking between an unequal number of input and output nodes.

With the above-identified structure and method, any subset of the internal pins can be routed to the available external I/Os. If properly designed, the structure can also be used to make arbitrary internal interconnections for routing interrupts, or DMA request signals, timer signals, and so on. The obvious benefit for SOC is the tremendous flexibility afforded to the system designer, and the simpler engineering and product definition for the SOC vendor.

The System On Chip team at Sharp Microelectronics Technology used an unique approach in dealing with the conflicting requirements of high peripheral integration for maximum flexibility on the one hand and low pin count for cost reduction on the other hand. Using a crossbar switch to interface on-chip peripherals to the external world gives the system designer and SOC vendor total flexibility without sacrificing design requirements. Other variations and embodiments of the invention will occur to those skilled in the art.

What is claimed is:

1. A System On Chip (SOC) crossbar switching network with a small time delay comprising:

N input nodes;

N output nodes;

n layers of N switches to multiplex signals between said input and output nodes;

in which each switch has 2i signal inputs operatively connected to said input nodes, each said switch multiplexing the input signals to provide an output signal at a signal output, and in which each said switch has i control inputs to select which input signal is output by said switch; and in which $N=2^{(n+i+1)}$, whereby each said output node is connectable to any said input node.

2. The SOC switching network as in claim 1 further comprising:

(N×2i) operative connections between each layer of switches, including operative connections between said input nodes and the first layer of switches.

3. The SOC switching network as in claim 1 in which N=64, i=2, and n=3.

4. The SOC switching network as in claim 1 including a second network comprising:

n layers of N switches to multiplex signals between said output and input nodes;

in which each switch has 2i signal inputs operatively connected to said output nodes, each said switch multiplexing the input signals to provide an output signal at a signal output, and in which each said switch has i control inputs to select which input signal is output by said switch; and in which $N=2^{(n+i+1)}$, whereby each said input node is connectable to any said output node.

5. The SOC switching network as in claim 3 in which the switches of the first layer are organized into groups of 4, and said input nodes are organized into groups of 4 to provide a vector of 4 signals to a corresponding switch group, and in which said first layer switches are operatively connected as follows:

nodes 0–3 are operatively connected to the 4 inputs of the first switch group to accept 4 input vectors, with each switch of said first switch group accepting one input vector, and in which said first switch group has four outputs, one output for each said switch to provide selectable signals from nodes 0–3;

nodes 4–7 are operatively connected to the 4 inputs of a second switch group to accept 4 input vectors, with the 4 outputs of said second switch group providing selectable signals from nodes 4–7;

nodes 8–11 are operatively connected to the 4 inputs of a third switch group to accept 4 input vectors, with the 4 outputs of said third switch group providing selectable signals from nodes 8–11;

nodes 12–15 are operatively connected to the 4 inputs of a fourth switch group to accept 4 input vectors, with the 4 outputs of said fourth switch group providing selectable signals from nodes 12–15;

in which the outputs of said first through fourth switch groups are combined to form second layer input vectors, whereby selectable signals from nodes 0–15 are provided;

in which nodes 16–63 are each operatively connected in groups of 4 to switch groups 5–16, as described above, with nodes 16–19 being operatively connected to a fifth switch group, with nodes 20–23 being operatively connected to a sixth switch group, with nodes 24–27 being operatively connected to a seventh switch group, with nodes 28–31 being operatively connected to a eighth switch group, with the outputs of said fifth through eighth switch groups combined to form second layer input vectors of selectable signals from nodes 16–31;

in which nodes 32–35 are operatively connected to a ninth switch group, with nodes 36–39 being operatively connected to a tenth switch group, with nodes 40–43 being operatively connected to a eleventh switch group, with nodes 44–47 being operatively connected to a twelfth switch group, with the outputs of said ninth through twelfth switch groups combined to form second layer input vectors of selectable signals from nodes 32–47;

in which nodes 48–51 are operatively connected to a thirteenth switch group, with nodes 52–55 being operatively connected to a fourteenth switch group, with nodes 56–59 being operatively connected to a fifteenth switch group, and with nodes 60–63 being operatively connected to a sixteenth switch group, with the outputs of said thirteenth through sixteenth switch groups combined to form a second layer input vector of selectable signals from nodes 48–63, whereby said first layer of switches accepts 64 vectors of signals and outputs 64 vectors of multiplexed signals.

6. The SOC switching network as in claim 5 in which the second layer of switches are organized into groups of 4, with each said switch having four inputs to accept a second layer input vector from the first layer of switches, and each said switch group having four outputs to provide a third layer input vector, said second layer switch groups operatively connected as follows:

a second layer first switch group to accept 4 second layer input vectors from said first layer first through fourth switch groups, with said second layer first switch group having four outputs, whereby each output signal includes selectable bits from nodes 0–15;

a second layer second switch group to accept 4 second layer input vectors from said first layer fifth through eighth switch groups, with said second layer second switch group having four outputs, whereby each output signal includes selectable bits from nodes 16–31;

a second layer third switch group to accept 4 second layer input vectors from said first layer ninth through twelfth switch groups, with said second layer third switch group having four outputs, whereby each output signal includes selectable bits from nodes 32–47;

a second layer fourth switch group to accept 4 second layer input vectors from said first layer thirteenth through sixteenth switch groups, with said second layer fourth switch group having four outputs, whereby each output signal includes selectable bits from nodes 48–63;

in which one output signal from each of said second layer first through fourth switch groups are combined to form third layer input vectors, whereby selectable signals from nodes 0–63 are provided;

in which second layer switch groups 5–16 are each operatively connected in groups of 4 to first layer switch groups 1–16, as described above, with second layer fifth switch group accepting 4 vectors from first layer first through fourth switch groups and providing four outputs, with second layer sixth switch group accepting 4 vectors from first layer fifth through eighth switch groups and providing 4 outputs, with second layer seventh switch group accepting 4 vectors from first layer ninth through twelfth switch groups and providing 4 outputs, with second layer eighth switch group accepting 4 vectors from first layer thirteenth through sixteenth switch groups and providing 4 outputs, in which one output signal from each of said second layer fifth through eighth switch groups are combined to form third layer input vectors, whereby selectable signals from nodes 0–63 are provided;

with second layer ninth switch group accepting 4 vectors from first layer first through fourth switch groups and providing four outputs, with second layer tenth switch group accepting 4 vectors from first layer fifth through eighth switch groups and providing 4 outputs, with second layer eleventh switch group accepting 4 vectors from first layer ninth through twelfth switch groups and providing 4 outputs, with second layer twelfth switch group accepting 4 vectors from first layer thirteenth through sixteenth switch groups and providing 4 outputs, in which one output signal from each of said second layer ninth through twelfth switch groups are combined to form third layer input vectors, whereby selectable signals from nodes 0–63 are provided;

with second layer thirteenth switch group accepting 4 vectors from first layer first through fourth switch groups and providing four outputs, with second layer fourteenth switch group accepting 4 vectors from first layer fifth through eighth switch groups and providing 4 outputs, with second layer fifteenth switch group accepting 4 vectors from first layer ninth through twelfth switch groups and providing 4 outputs, with second layer sixteenth switch group accepting 4 vectors from first layer thirteenth through sixteenth switch groups and providing 4 outputs, in which one output signal from each of said second layer thirteenth through sixteenth switch groups are combined to form third layer input vectors, whereby selectable signals from nodes 0–63 are provided, whereby said second layer of switches accepts 64 vectors of signals and outputs 64 vectors of multiplexed signals.

7. The SOC switching network as in claim 6 in which the third layer of switches are organized into groups of 4, with each said switch having four inputs to accept a third layer input vector from the second layer of switches, and each said switch group having four outputs to provide a output node vector, said third layer switch groups operatively connected as follows:

a third layer first switch group to accept 4 third layer input vectors from said second layer first through fourth switch groups, with said third layer first switch group having four outputs operatively connected to corresponding output nodes 0–3 to provide output node vectors, whereby each output node vector includes selectable bits from nodes 0–63;

a third layer second switch group to accept 4 third layer input vectors from said second layer first through fourth switch groups, with said third layer second switch group having four outputs operatively connected to corresponding output nodes 4–7 to provide output node vectors, whereby each output node vector includes selectable bits from nodes 0–63;

a third layer third switch group to accept 4 third layer input vectors from said second layer first through fourth switch groups, with said third layer third switch group having four outputs operatively connected to corresponding output nodes 8–11 to provide output node vectors, whereby each output node vector includes selectable bits from nodes 0–63;

a third layer fourth switch group to accept 4 third layer input vectors from said second layer first through fourth switch groups, with said third layer fourth switch group having four outputs operatively connected to corresponding output nodes 12–15 to provide output node vectors, whereby each output node vector includes selectable bits from nodes 0–63;

a third layer fifth switch group to accept 4 third layer input vectors from said second layer fifth through eighth switch groups, with said third layer fifth switch group having four outputs operatively connected to corresponding output nodes 16–19 to provide output node vectors, whereby each output node vector includes selectable bits from nodes 0–63;

a third layer sixth switch group to accept 4 third layer input vectors from said second layer fifth through eighth switch groups, with said third layer sixth switch group having four outputs operatively connected to corresponding output nodes 20–23 to provide output node vectors, whereby each output node vector includes selectable bits from nodes 0–63;

a third layer seventh switch group to accept 4 third layer input vectors from said second layer fifth through eighth switch groups, with said third layer seventh switch group having four outputs operatively connected to corresponding output nodes 24–27 to provide output node vectors, whereby each output node vector includes selectable bits from nodes 0–63;

a third layer eighth switch group to accept 4 third layer input vectors from said second layer fifth through eighth switch groups, with said third layer eighth switch group having four outputs operatively connected to corresponding output nodes 28–31 to provide output node vectors, whereby each output node vector includes selectable bits from nodes 0–63;

a third layer ninth switch group to accept 4 third layer input vectors from said second layer ninth through twelfth switch groups, with said third layer ninth switch group having four outputs operatively connected to corresponding output nodes 32–35 to provide output node vectors, whereby each output node vector includes selectable bits from nodes 0–63;

a third layer tenth switch group to accept 4 third layer input vectors from said second layer ninth through twelfth switch groups, with said third layer tenth switch group having four outputs operatively connected to corresponding output nodes 36–39 to provide output node vectors, whereby each output node vector includes selectable bits from nodes 0–63;

a third layer eleventh switch group to accept 4 third layer input vectors from said second layer ninth through twelfth switch groups, with said third layer eleventh switch group having four outputs operatively connected to corresponding output nodes 40–43 to provide output node vectors, whereby each output node vector includes selectable bits from nodes 0–63;

a third layer twelfth switch group to accept 4 third layer input vectors from said second layer ninth through twelfth switch groups, with said third layer twelfth switch group having four outputs operatively connected to corresponding output nodes 44–47 to provide output node vectors, whereby each output node vector includes selectable bits from nodes 0–63;

a third layer thirteenth switch group to accept 4 third layer input vectors from said second layer thirteenth through sixteenth switch groups, with said third layer thirteenth switch group having four outputs operatively connected to corresponding output nodes 48–51 to provide output node vectors, whereby each output node vector includes selectable bits from nodes 0–63;

a third layer fourteenth switch group to accept 4 third layer input vectors from said second layer thirteenth through sixteenth switch groups, with said third layer fourteenth switch group having four outputs operatively connected to corresponding output nodes 52–55 to provide output node vectors, whereby each output node vector includes selectable bits from nodes 0–63;

a third layer fifteenth switch group to accept 4 third layer input vectors from said second layer thirteenth through sixteenth switch groups, with said third layer fifteenth switch group having four outputs operatively connected to corresponding output nodes 56–59 to provide output node vectors, whereby each output node vector includes selectable bits from nodes 0–63;

a third layer sixteenth switch group to accept 4 third layer input vectors from said second layer thirteenth through sixteenth switch groups, with said third layer sixteenth switch group having four outputs operatively connected to corresponding output nodes 60–63 to provide output node vectors, whereby each output node vector includes selectable bits from nodes 0–63, whereby.

8. A System On Chip (SOC) crossbar switching network with a small time delay comprising:

N input nodes;

N output nodes;

n layers of N high impedance switches to multiplex signals between said input and output nodes;

in which each switch has one signal input operatively connected to one corresponding input node, each said switch having 2i signal outputs, with each said switch selectively providing the input signal at one of said outputs, and in which each said switch has i control inputs to select which output is selected; and in which $N=2^{(n+i+1)}$, whereby each said output node is connectable to any said input node.

9. A System On Chip (SOC) crossbar connection network with a small time delay comprising:

N functional input/output (I/O) nodes internal to the IC;

M I/O pins to physically access the IC;

(n−1) layers of N switches to multiplex signals between said input nodes and said switch layers;

one final layer of M switches to multiplex signals from said final switch layer to said M physical pins;

in which M is less than N;

in which $N=2^{(n+i+1)}$; and in which each switch has 2i signal inputs operatively connected to said input nodes, each said switch multiplexing the input signals to provide an output signal at a signal output, and in which each said switch has i control inputs to select which input signal is output by said switch, whereby a plurality of said output nodes are connectable to a greater plurality of input nodes.

10. The SOC switching network as in claim 9 further comprising:

(N×2i) operative connections, with the operative connections grouped in sets of 2i to form N vectors between said switch layers and between said functional I/Os and the first layer of switches.

11. The SOC switching network as in claim 9 including a second network to input signals at said physical pins to said functional I/Os, the second network comprising:

one layer of M switches to multiplex signals from said M physical pins to said (n−1) switch layers;

(n−1) layers of N switches to multiplex signals between said switch layers and said input nodes;

in which $N=2^{(n+i+1)}$; and in which each switch has 2i signal inputs operatively connected to said output nodes, each said switch multiplexing the input signals to provide an output signal at a signal output, and in which each said switch has i control inputs to select which input signal is output by said switch, whereby the signal at each said pin is operatively connectable to any said functional I/O.

12. The SOC switching network as in claim 9 in which N=64, M=40, i=2, and i=3.

13. In a System On Chip (SOC), a method for crossbar networking input signals from N input nodes to N output nodes in n stages of decision making, where $N=2^{(n+i+1)}$, the method comprising the steps of:

a) combining the N input signals into vectors of 2i bits each to form (N/2i) vectors;

b) replicating each vector of Step a) a total of 2i times to form a total of N vectors;

c) selecting one signal from each vector to provide an input signal to the next stage;

d) cycling through Steps a)-c) a total of n times, whereby each output node is selectively connectable to each of the N input nodes through n steps of decision making.

14. A method as in claim 13 in which N=64, i=2, and n=3.

15. A method as in claim 13 wherein input signals at the output nodes are provided to the input nodes, and including the following steps of:

e) combining the N input signals into vectors of 2i bits each to form (N/2i) vectors;

f) replicating each vector of Step e) a total of 2i times to form a total of N vectors;

g) selecting one signal from each vector to provide an input signal to the next stage;

h) cycling through Steps e)–g) a total of n times, whereby each input node is selectively connectable to each of the N output nodes through n steps of decision making.

16. A method as in claim 15 wherein Steps a)–d) occur simultaneously with Steps e)–h), whereby the method permits bi-direction signal flow, from the input nodes to the output nodes, and from the output nodes to the input nodes.

17. In a System On Chip (SOC), a method for crossbar networking input signals from N functional I/Os in an IC to M external connector pins in n stages of decision making, where $N=2^{(n+i+1)}$, the method comprising the steps of:

a) combining the N input signals into vectors of 2i bits each to form N/2i vectors;

b) replicating each vector from Step a) a total of 2i times to form a total of N vectors;

c) selecting one signal from each vector to provide an input signal to the next stage;

d) cycling through Steps a)–c) a total of (n−1) times;

e) combining the N input signals into vectors of 2i bit each to form N/2i vectors;

f) replicating each vector form Step e) a total of at least (M/N)2i times to form a total of M vectors; and g) selecting one signal from each vector to provide an input signal to each of the M connector pins, whereby signals at the N functional I/Os are made available at the M connector pins.

18. A method as in claim 17 wherein input signals are networked from the M connector pins to the N functional I/Os, and including the following steps of:

h) combining the M input signals into vectors of 2i bits each to form M/2i vectors;

i) replicating each vector formed in Step h) a total of 2i times to form a total of M vectors;

j) selecting one signal from each vector to provide an input signal to the next stage;

k) combining the M input signals into vectors of from 1 to 2i bits, to form a total of N/2i vectors;

l) replicating each vector formed in Step 1) a total of 2i times to form a total of N vectors;

m) selecting one signal from each vector to provide an input signal to the next stage;

n) cycling through Steps k)–m) a total of (n−1) times, whereby each input node is selectively connectable to each of the M output nodes through n steps of decision making.

19. A method as in claim 18 wherein Steps a)–g) occur simultaneously with Steps h)–m), whereby the method permits bi-direction signal flow, from the functional I/Os to the connector pins, and from the connector pins to the functional I/Os.

20. A method as in claim 17 wherein N=64, M=40, n=3, and i=2.

21. In a System On Chip (SOC), a method for crossbar networking input signals from N functional I/Os in an IC to N external connector pins in n stages of decision making, where $N=2^{(n+i+1)}$, the method comprising the steps of:

a) generating 2i signal paths for each of the N input signals;

b) combining the (2i)N input signals into vectors of 2i bits to form N vectors;

c) selecting one signal from each vector to provide an input signal to the next stage; and d) cycling through Steps a)–c) a total of n times, whereby each input node is selectively connectable to each of the N output nodes through n steps of decision making.

* * * * *